United States Patent
Vaghani et al.

(10) Patent No.: US 10,776,206 B1
(45) Date of Patent: Sep. 15, 2020

(54) DISTRIBUTED TRANSACTION SYSTEM

(75) Inventors: Satyam B. Vaghani, Palo Alto, CA (US); Yuen-Lin Tan, Pacifica, CA (US); Abhishek Rai, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 2225 days.

(21) Appl. No.: 11/707,724

(22) Filed: Feb. 16, 2007

Related U.S. Application Data

(63) Continuation-in-part of application No. 10/773,613, filed on Feb. 6, 2004.

(51) Int. Cl.
  *G06F 16/176* (2019.01)
  *G06F 11/14* (2006.01)

(52) U.S. Cl.
  CPC .................................. *G06F 11/1402* (2013.01)

(58) Field of Classification Search
  CPC .............................................. G06F 17/30067
  See application file for complete search history.

(56) References Cited

U.S. PATENT DOCUMENTS

| | | | |
|---|---|---|---|
| 4,429,360 A | 1/1984 | Hoffman et al. | |
| 5,151,988 A * | 9/1992 | Yamagishi | 707/8 |
| 5,226,159 A | 7/1993 | Henson et al. | |
| 5,251,318 A | 10/1993 | Nitta et al. | |
| 5,414,840 A * | 5/1995 | Rengarajan et al. | |
| 5,502,840 A | 3/1996 | Barton | |
| 5,606,679 A | 2/1997 | Cohn et al. | |
| 5,692,178 A | 11/1997 | Shaughnessy | |
| 5,848,241 A * | 12/1998 | Misinai et al. | 709/213 |
| 6,009,427 A | 12/1999 | Wolff | |
| 6,078,982 A | 6/2000 | Du et al. | |
| 6,105,085 A | 8/2000 | Farley | |
| 6,105,099 A | 8/2000 | Freitas et al. | |
| 6,128,710 A | 10/2000 | Greenspan et al. | |
| 6,247,023 B1 * | 6/2001 | Hsiao et al. | |
| 6,330,560 B1 | 12/2001 | Harrison et al. | |
| 6,389,420 B1 | 5/2002 | Vahalia et al. | |
| 6,466,978 B1 | 10/2002 | Mukherjee et al. | |
| 6,609,128 B1 | 8/2003 | Underwood | |
| 6,622,163 B1 | 9/2003 | Tawill et al. | |
| 6,658,417 B1 | 12/2003 | Stakutis | |
| 6,842,896 B1 | 1/2005 | Redding et al. | |

(Continued)

OTHER PUBLICATIONS

Non-Final Rejection dated Nov. 17, 2009 for U.S. Appl. No. 11/676,109, filed Feb. 16, 2007.

(Continued)

*Primary Examiner* — Mohammad S Rostami
(74) *Attorney, Agent, or Firm* — Patterson + Sheridan, LLP

(57) ABSTRACT

Described herein is technology for, among things, a distributed transaction system. The distributed transaction system includes a number of computing entities and a data storage unit in communication with the computing entities. The data storage unit is operable to store a file system that is accessible by the computing entities. The data storage unit is also operable to store a number of transaction journals corresponding to respective computing entities. The transaction journals describe transactions of the computing entities on the file system. A particular computing entity is operable to maintain a respective transaction journal without communicating with the other computing entities.

17 Claims, 15 Drawing Sheets

(56) References Cited

U.S. PATENT DOCUMENTS

| | | | |
|---|---|---|---|
| 6,920,454 B1 | 7/2005 | Chan | |
| 7,089,561 B2 | 8/2006 | Morrison et al. | |
| 7,103,616 B1 | 9/2006 | Harmer et al. | |
| 7,107,267 B2 | 9/2006 | Taylor | |
| 7,117,481 B1 | 10/2006 | Agesen et al. | |
| 7,124,131 B2 | 10/2006 | Guthridge | |
| 7,240,057 B2 * | 7/2007 | Kingsbury et al. | 707/8 |
| 7,284,151 B2 | 10/2007 | Chandrasekaran | |
| 7,289,992 B2 | 10/2007 | Walker | |
| 7,293,011 B1 | 11/2007 | Bedi et al. | |
| 7,490,089 B1 * | 2/2009 | Georgiev | |
| 7,502,752 B1 * | 3/2009 | Lemons et al. | 705/35 |
| 7,516,285 B1 | 4/2009 | Haynes et al. | |
| 7,552,122 B1 * | 6/2009 | Georgiev | |
| 7,711,539 B1 | 5/2010 | Kimmel et al. | |
| 7,849,098 B1 | 12/2010 | Scales et al. | |
| 8,321,643 B1 | 11/2012 | Vaghani et al. | |
| 8,489,636 B2 | 7/2013 | Scales et al. | |
| 8,560,747 B1 | 10/2013 | Tan et al. | |
| 8,700,585 B2 | 4/2014 | Vaghani et al. | |
| 9,031,984 B2 | 5/2015 | Scales et al. | |
| 9,130,821 B2 | 9/2015 | Rawat et al. | |
| 2002/0016771 A1 * | 2/2002 | Carothers et al. | 705/43 |
| 2002/0111995 A1 | 8/2002 | Mansour et al. | |
| 2002/0143704 A1 * | 10/2002 | Nassiri | 705/51 |
| 2002/0165929 A1 | 11/2002 | McLaughlin et al. | |
| 2002/0174139 A1 * | 11/2002 | Midgley et al. | 707/204 |
| 2003/0041227 A1 | 2/2003 | Nakamatsu | |
| 2003/0055327 A1 | 3/2003 | Shaw et al. | |
| 2003/0065672 A1 * | 4/2003 | Kingsbury et al. | 707/100 |
| 2003/0105756 A1 * | 6/2003 | Daynes | 707/8 |
| 2003/0105796 A1 * | 6/2003 | Sandri | G06F 9/5011 718/104 |
| 2003/0225760 A1 * | 12/2003 | Ruuth et al. | 707/5 |
| 2004/0073831 A1 * | 4/2004 | Yanai et al. | 714/7 |
| 2004/0078658 A1 * | 4/2004 | Park et al. | 714/16 |
| 2004/0117580 A1 | 6/2004 | Wu et al. | |
| 2004/0215670 A1 * | 10/2004 | Holenstein et al. | 707/201 |
| 2004/0220931 A1 | 11/2004 | Guthridge et al. | |
| 2004/0220932 A1 | 11/2004 | Seeger et al. | |
| 2004/0249838 A1 * | 12/2004 | Hinshaw et al. | 707/100 |
| 2004/0268062 A1 | 12/2004 | Ofer | |
| 2005/0091238 A1 * | 4/2005 | Zane et al. | 707/100 |
| 2005/0149683 A1 | 7/2005 | Chong, Jr. et al. | |
| 2005/0206499 A1 | 9/2005 | Fisher | |
| 2006/0047713 A1 * | 3/2006 | Gornshtein et al. | 707/202 |
| 2006/0069665 A1 | 3/2006 | Yamakawa et al. | |
| 2007/0083687 A1 | 4/2007 | Rinaldi et al. | |
| 2007/0214161 A1 | 9/2007 | Goyal et al. | |
| 2008/0168548 A1 | 7/2008 | O'Brien | |
| 2008/0184249 A1 | 7/2008 | Adams et al. | |
| 2009/0106248 A1 | 4/2009 | Vaghani et al. | |
| 2009/0210880 A1 | 8/2009 | Fachan et al. | |
| 2010/0017409 A1 | 1/2010 | Rawat et al. | |
| 2011/0179082 A1 | 7/2011 | Vaghani et al. | |

OTHER PUBLICATIONS

Windows 2000 Support, How to specify an IP address, Last revised Oct. 31, 2006, Microsoft, http://support.microsoft.com/kb/308199.

Helming, Windows 2000/XP TCP/IP protocol, Feb. 18, 2001, WindowsNetworking.com, http://windowsnetworking.com/articles_tutorials/w2ktcpip.html.

The Authoritative Dictionary of IEEE Standard Terms, 2000, IEEE Standard Terms, 2000, IEEE, 7th ed. p. 318.

Venners, Inside the Java Virtual Machine, unknown but at least 1998, Computing McGraw-Hill, 2nd Edition, Chapter 5.

* cited by examiner

US 10,776,206 B1

DISTRIBUTED TRANSACTION SYSTEM

CLAIM OF PRIORITY UNDER 35 U.S.C. § 120

The present Application for Patent is a continuation-in-part of U.S. patent application Ser. No. 10/773,613 entitled "Providing Multiple Concurrent Access to a File System" filed Feb. 6, 2004, pending, and assigned to the assignee hereof and hereby expressly incorporated by reference herein.

REFERENCE TO CO-PENDING APPLICATIONS FOR PATENT

The present Application for Patent is related to the following co-pending U.S. Patent Application:

U.S. patent application Ser. No. 11/676,109 entitled "SYSTEM AND METHOD FOR IMPLEMENTING DISTRIBUTED LOCKS VIA ON-DISK HEARTBEATING" filed Feb. 16, 2007, pending, assigned to the assignee hereof, and expressly incorporated by reference herein.

BACKGROUND

Field

This invention relates to a distributed transaction system within a computer system, or, more specifically, to providing multiple computers or other computing entities with concurrent access to a file system or other structured data system while maintaining a crash recovery journal.

Background

File systems, databases, and other structured, concurrent, multi-user, and possibly distributed data storage systems process user requests in a way that the state of user data on persistent storage, as visible to the user, is always consistent. Intermediate, inconsistent data states on persistent storage are shielded from being exported to the users through various volatile concurrency control mechanisms, such as reader-writer semaphores, locks, etc. However, in the event of a server or storage system crash, such inconsistent persistent state would be exposed to the user post-crash. Structured data storage systems therefore implement a crash recovery procedure that either rolls back an intermediate state of data on the disk to a known consistent state at a previous point in time or rolls forward the intermediate state of data on the disk to the expected future consistent state, had the crash not occurred.

One previous mechanism for crash recovery is known as a file system check, or "fscheck". An fscheck involves checking an entire file system exhaustively in order to correlate data structures. Consider for example a hypothetical computer system that crashes in the middle of allocating a new block to a file. File systems often use file descriptors that include several addresses to data blocks that the corresponding file is using. File systems also commonly employ a global bitmap of resources, where each bit of the bitmap indicates whether a block has been allocated to a file or not. Thus, in order to allocate the new block, the bitmap needs to be updated to indicate that the corresponding block has been allocated and the file descriptor needs to be updated with the address of the newly allocated block. In the above hypothetical case, it is entirely possible that the bitmap was successfully updated prior to the crash, but the address in the file descriptor was not. Consequently, the inconsistency must be resolved upon restart. This is achieved by either rolling back by changing the bitmap so that the block is unallocated or rolling forward by changing the file descriptor so that the appropriate address is updated. In an fscheck, this process must be repeated for all file system objects, descriptors, directory entries, etc., to see whether they are consistent with respect to each other. In other words, for every block, the computer system must check whether any file refers to it or points to it. If an allocated block does not correlate to anything, it will likely need to be unallocated. It should be apparent that scanning an entire file system can be very intensive. Moreover, as disk storage capacities continue to increase, file system scanning becomes more and more infeasible. In the context of a distributed file system, where one or more file systems are shared among multiple clients or nodes, a crash at a single client translates into downtime for the other clients in the cluster while the file system is correlated.

Another approach to crash recovery that has been used increasingly in recent years involves journaling. In journaling, client actions on persistent storage are often executed as transactions such as Atomicity, Consistency, Isolation, and Durability (ACID) transactions. These transactions are written to a journal on a persistent storage, and crash recovery is simplified to a matter of replaying or undoing "in-flight" transactions that are part of the journal at the time of crash. Typically, the various hosts in the cluster access the data storage via a storage area network, while the hosts generally communicate with each other via a separate local area network.

Journaling and journal-based recovery becomes an even more complex problem when multiple independent hosts are working on the same distributed file system or distributed database. FIG. 1 illustrates a block diagram of conventional mechanisms for implementing journal-based recovery in a distributed file system scenario, involving the use of a centralized transaction manager 120 for coordinating the order of transactions to the file system 164 across the servers 12. In one such system, allocation of a block involves a server 12 making a request over the local area network 110 to the transaction manager 120 for a block and the transaction manager 120 providing an address of a block to the server 12. The server 12 can then read or write user data from or to the newly allocated block using the storage area network 140. During the course of operation, the transaction manager 120 maintains a common journal for crash recovery across all the servers 12. The journal is usually stored on some disk inside a data storage unit 130. The transaction manager accesses the file system 164 and the journal through the storage area network 140.

Transaction managers 120 are very complicated and suffer from several implementation issues. One issue is that the servers 12 will now be serialized on a single transaction queue/journal. Moreover, a transaction manager 120 is most often implemented as a network entity. This causes the availability of the file system 164 to become dependent on the availability of the local area network 110 in addition to the expected dependency on the availability of the data storage network 140, the data storage unit 130, and the transaction manager 120. In other words, the availability of the local area network 110 plays a part in determining availability of the file system 164 even though the servers 12 do not need to use the local area network 110 to access the data storage unit 130. Users are thus burdened with using extra hardware and configuring these network entities. Furthermore, because a single transaction manager 120 would become a single point of failure, end-users often cluster multiple transaction managers 120, which leads to additional software complexity, network requirements, configuration, and maintenance overhead.

Another conventional mechanism for implementing journal-based recovery in a distributed file system scenario improves upon the centralized transaction manager 120 by putting the servers 12 themselves in charge of the journaling. In this system, the servers 12 can either maintain a single, collective journal or individual journals. In many situations, a system such as this is not desirable for various reasons. First, when one of the servers 12 crashes, the entire global journal or the journals of all the servers 12 must be replayed. This is due to the fact that it is not known, for instance, whether two or more of the servers 12 are attempting to change the same bit at the same time (i.e., an overlap in metadata operations). In other words, there is no way of knowing that the set of resources that one server 12 crashed with was not being concurrently accessed by another server 12 at the time of the crash. Thus, considerable time and resources can be expended replaying all the journals. Moreover, in order to properly maintain the journals, some communication and/or arbitration often occurs between the servers 12 over the local area network 110. Thus, the availability is once again a function of the availability of both the local area network 110 and the storage area network 140, even though the servers 12 do not use the local area network 110 to physically access the file system 164.

The conventional mechanisms described above have no means of guaranteeing that the set of resources that are part of a given host's or server's transaction are not being updated by any other hosts at that particular point in time without using a local area network. Furthermore, these mechanisms are not able to replay or undo transactions in a particular journal corresponding to a particular host post-crash, independent of any other journal that may exist on the same file system or database. Additionally, conventional mechanisms do not allocate and de-allocate journals dynamically. This adds overhead when users want to add or delete hosts that use the file system. Since this is a manual process, a new host stays offline with respect to the file system until a system administrator configures its journal, network connectivity, etc.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among things, a distributed transaction system. The distributed transaction system includes a number of computing entities and a data storage unit in communication with the computing entities. The data storage unit is operable to store a file system that is accessible by the computing entities. The data storage unit is also operable to store a number of transaction journals corresponding to respective computing entities. The transaction journals describe transactions of the computing entities on the file system. A particular computing entity is operable to maintain a respective transaction journal without communicating with the other computing entities.

Thus, embodiments allow for the implementation of a truly distributed transaction manager. The implementation includes a suitable transaction and journal format, such that every computing entity may maintain its own journal without communicating with other computing entities sharing the same file system or database. Computing entities execute transactions independent of each other, and embodiments can guarantee that the set of resources that are part of a given computing entity's transaction are not being updated by any other computing entities at that particular point in time. As such, embodiments allow for computing entities to replay or undo transactions in a given journal post-crash, independent of any other journal that may exist on the same file system or database, the result being a partially and sufficiently consistent file system. The journals may be created and deleted dynamically as computing entities come and go online, and out of the file system's own address space. Additionally, embodiments allow for an upper bound to be placed on the amount of space required per journal. This makes embodiments scalable to a large number of hosts concurrently accessing the file system or database because the storage requirements do not grow exponentially, which also imposes an upper bound on crash recovery time per journal.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
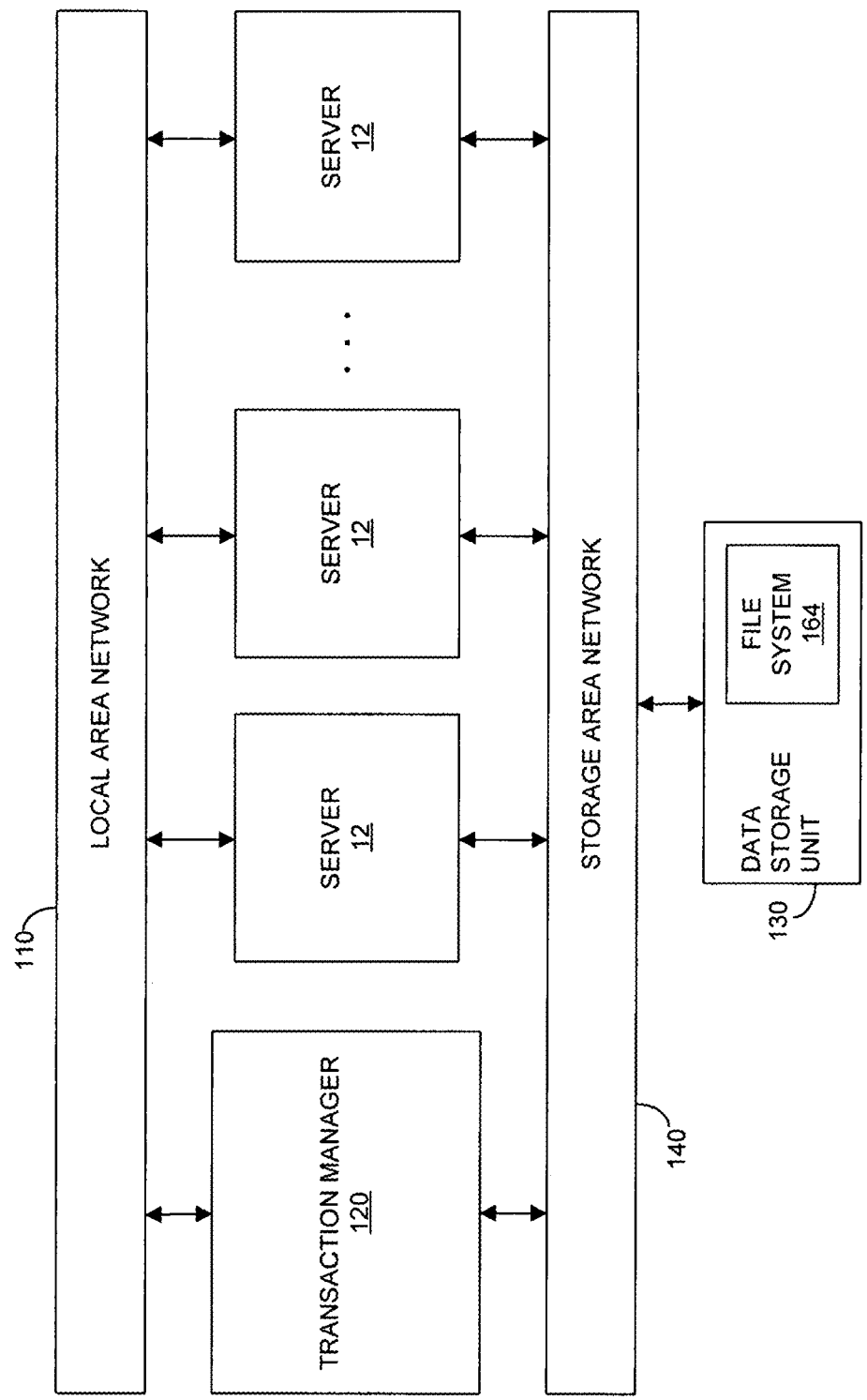
FIG. 1 illustrates a block diagram of conventional mechanisms for implementing journal-based recovery in a distributed file system scenario.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

Generally speaking, embodiments provide for a truly distributed transaction system. This is achieved through a unique transaction and journal format, such that every host can maintain its own journal without communicating with other hosts sharing the same file system or database. In other words, hosts may execute transactions independent of each other, and embodiments can guarantee that the set of resources that are part of a given host's transaction are not being updated by any other hosts at that particular point in time. Consequently, hosts are able to replay or undo transactions in a given journal post-crash, independent of any other journal that may exist on the same file system or database. The result of this replay is a partially (and sufficiently) consistent file system.

The present invention is generally applicable in computing environments where data storage volumes used by client computing entities are managed within a distributed storage system. Accordingly, a preferred environment for the implementation of the present invention involves otherwise conventional storage area network (SAN) based data centers. From the following detailed description of the invention, however, those of ordinary skill in the art will readily understand that the present invention is not constrained to use in a particular environment, system or network architecture or by use of a particular operating system or set of data communications protocols. The following description of the present invention is presented in the context of a data center application as illustrative of a preferred embodiment for clarity of presentation and explanation. Also for clarity of description, as used in the following detailed description of the invention, like reference numerals are used to designate like parts depicted in one or more of the figures.

Exemplary Operating Environments

Figure 2:
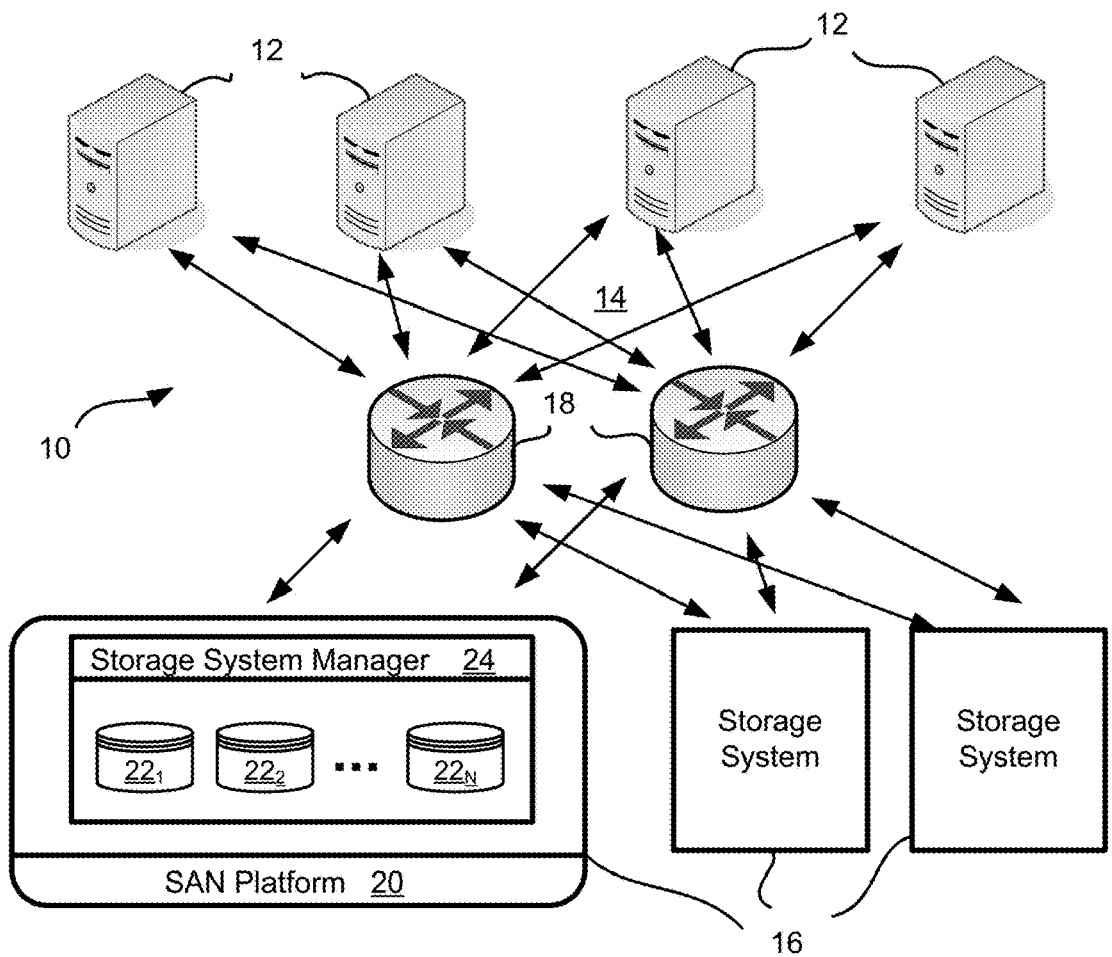
FIG. 2 illustrates a block diagram of a data center hosted operating environment, in accordance with various embodiments of the present invention.

As generally shown in FIG. 2, a preferred data center 10 hosted implementation of the present invention typically supports one or more tiers of computing entities 12 that, directly as clients or as servers operating indirectly on behalf of one or more upper tiers of client and server computing entities, provide access to logical units of storage hosted by a SAN 14 and underlying data storage systems 16. The SAN 14 can be implemented using any of a variety of technologies, though typically using Fibre Channel or iSCSI technology. These technologies allow construction of a redundant, failover, and multipath capable interconnection network, using for example redundant routers 18 and network connections, which in turn ensure overall reliability. In a typical implementation, additional data management features are implemented through logical volume managers and data access layers executed in a server tier of computing entities 12. Client computing entities are constrained to mounting and accessing data storage volumes through the server tier and thereby effectively inherit the logical unit management functions implemented by the logical volume managers of the server tier. Logical volume managers, however, can be and frequently are implemented at multiple levels including in client computing entities.

The different potential locations of logical storage managers are generally not significant to the operation of the SAN 14 and, in particular, the underlying data storage systems 16. While the SAN 14 provides routeable multipath access, the data storage systems 16 present a relatively large collection of externally visible LUNs, also referred to in the context of the present invention as data storage units (DSUs), accessible by the computing entities 12, subject to conventional access controls. Individually, the data storage systems 16 are relatively conventional computer platforms 20, though specialized to support typically high-bandwidth fibre channel network interfaces and to host large parallel arrays of typically SCSI-based disk drive storage units $22_1$-$22_N$. Aggregate network bandwidth at the SAN 14 interface typically in excess of 200 Megabytes per second and online storage capacity in excess of 10 terabytes on a single system 16 is presently not uncommon. Collectively, the data storage systems 16 are often geographically distributed to reduce access latency, distribute load, and ensure that power and network disruptions do not compromise the entire function of the system 10.

Conventionally, a storage system manager 24 is executed on the storage system platform 20 to implement a virtualization of the physical, typically disk drive-based storage units $22_1$-$22_N$ present in the local storage system 16. The storage system manager 24 performs the real to virtual translations necessary to support the presentation of data storage units to the computing entities 12 for use as, in effect, standard SCSI-based LUNs. This virtualization of the internal LUN storage allows a more efficient utilization of the physical storage units $22_1$-$22_N$ through logical aggregation into a contiguous container storage space. The container may be dynamically reconfigured and expanded depending on demand patterns without materially affecting the ongoing use of a particular data storage system 16 by the computing entities 12; the presentation of the data storage units can be preserved even while maintenance is performed on an array of physical storage units $22_1$-$22_N$.

Figure 3:
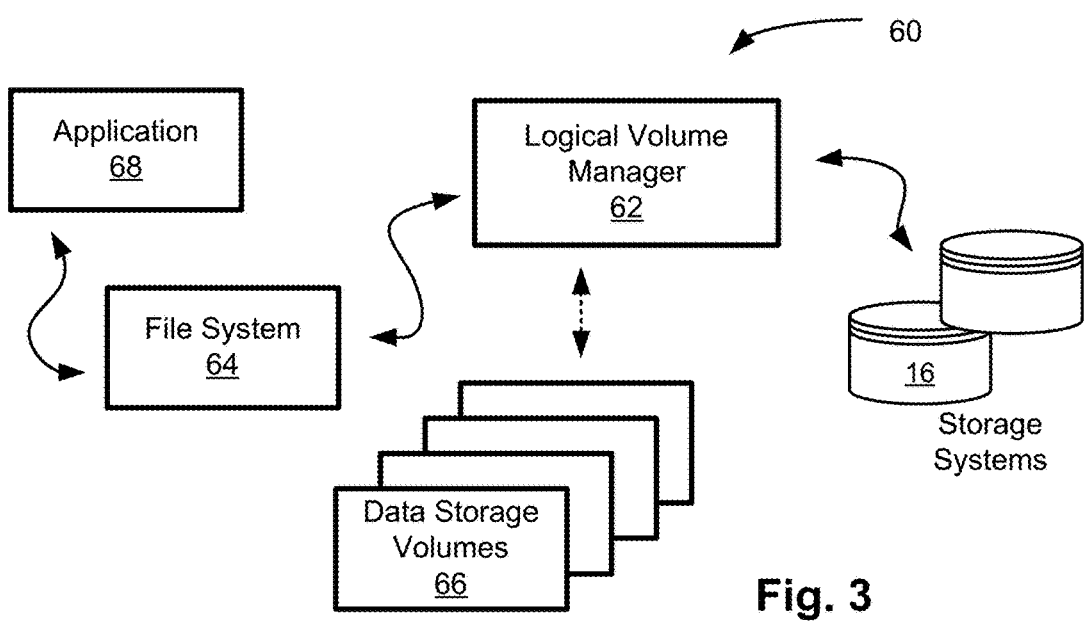
FIG. 3 is a block diagram illustrating a distributed file system and logical volume management architecture utilized by an embodiment of the present invention.

As generally illustrated in FIG. 3, a typical system architecture 60 implements a logical volume manager 62 on a computing entity 12, that is, at a system tier above the data storage systems 16 and as a software layer beneath a local file system layer 64. By execution of the logical volume manager 62, the file system layer 64 is presented with a data storage view represented by one or more discrete data storage volumes 66, each of which is capable of containing a complete file system data structure. The specific form and format of the file system data structure is determined by the particular file system layer 64 employed. In various embodiments of the present invention, physical file systems, including the New Technology File System (NTFS), the Unix File System (UFS), the VMware Virtual Machine File System (VMFS), and the Linux third extended file system (ext3FS), may be used as the file system layer 64.

As is conventional for logical volume managers, each of the data storage volumes 66 is functionally constructed by the logical volume manager 62 from an administratively defined set of one or more data storage units representing LUNs. Where the LUN storage, at least relative to the logical volume manager 62, is provided by network storage systems 16, the data storage volumes 66 are assembled from an identified set of the data storage units externally presented by the network storage systems 16. That is, the logical volume manager 62 is responsible for functionally managing and distributing data transfer operations to the various data storage units of particular target data storage volumes 66. The operation of the logical volume manager 62, like the operation of the storage system manager 24, is transparent to applications 68 executed directly by computing entities 12 or by clients of computing entities 12.

Figure 4:
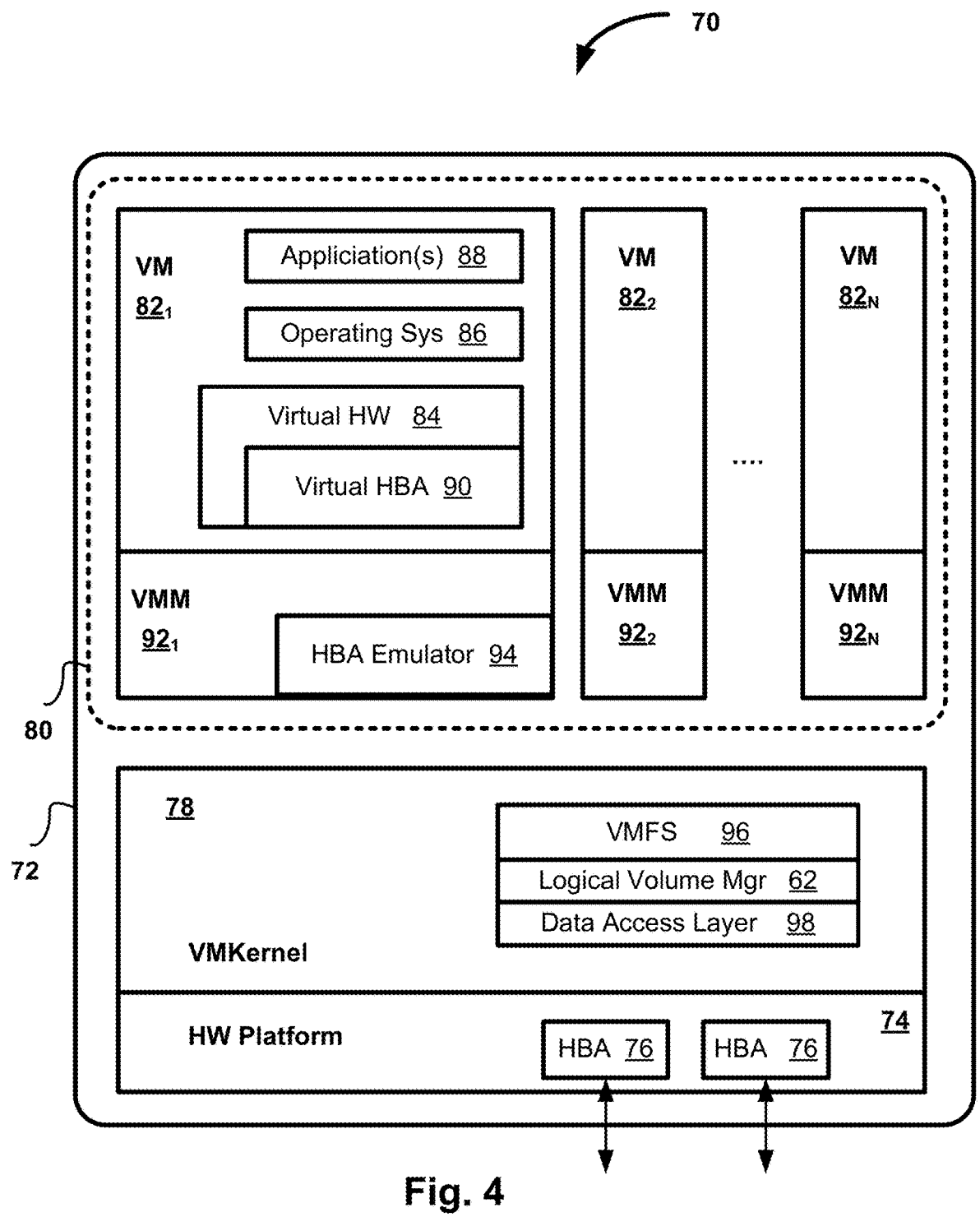
FIG. 4 is a block diagram of a system architecture implementing a virtual machine, in accordance with various embodiments of the present invention.

FIG. 4 illustrates a system architecture 60 for implementing a virtual machine based system 70, in accordance with various embodiments of the present invention. An integral computing entity 72, generally corresponding to one of the computing entities 12, is constructed on a conventional, typically server-class hardware platform 74, including in particular host bus adapters 76 in addition to conventional platform processor, memory, and other standard peripheral components (not separately shown). The server platform 74 is used to execute a virtual machine (VMKernel) operating system 78 supporting a virtual machine execution space 80 within which virtual machines (VMs) $82_1$-$82_N$ are executed. For the preferred embodiments of the present invention, the virtual machine kernel 78 and virtual machines $82_1$-$82_N$ are implemented using the ESX Server virtualization product manufactured and distributed by VMware, Inc., Palo Alto, Calif. However, use of the ESX Server product and, further, implementation using a virtualized computing entity 12 architecture, is not required in the practice of the present invention.

In summary, the virtual machine operating system 78 provides the necessary services and support to enable concurrent execution of the virtual machines $82_1$-$82_N$. In turn, each virtual machine $82_1$-$82_N$ implements a virtual hardware platform 84 that supports the execution of a guest operating system 86 and one or more typically client application programs 88. For the preferred embodiments of the present invention, the guest operating systems 86 are instances of Microsoft Windows, Linux and Netware-based operating systems. Other guest operating systems can be equivalently used. In each instance, the guest operating system 86 includes a native file system layer, typically either an NTFS or ext3FS type file system layer. These file system layers interface with the virtual hardware platforms 84 to access, from the perspective of the guest operating systems 86, a data storage host bus adapter. In a preferred implementation, the virtual hardware platforms 84 implement virtual host bus adapters 90 that provide the appearance of the necessary system hardware support to enable execution of the guest operating system 86 transparent to the virtualization of the system hardware.

Exemplary Data Structures in Accordance with Various Embodiments

Figure 5:
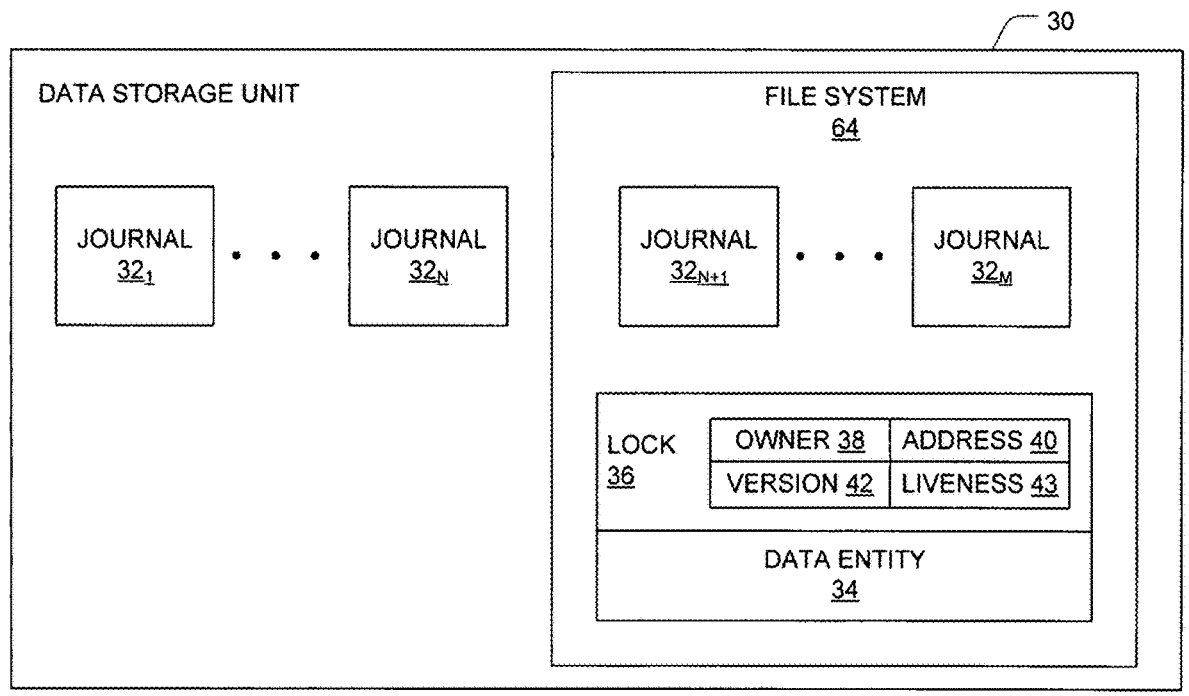
FIG. 5 illustrates a data structure, in accordance with various embodiments of the present invention.

FIG. 5 illustrates a data storage unit (DSU) 30, in accordance with various embodiments of the present invention. As shown, the DSU 30 includes a file system 64. It should be appreciated that any other structured data system, such as a database, may be substituted for file system 64. The file system 64 may comprise a conventional file system, including a plurality of files of various types, typically organized into one or more directories. The file system 64 may include metadata that specifies information about the file system 64, such as some data structure that indicates which data blocks in the file system remain available for use, along with other metadata indicating the directories and files in the file system, along with their location. Each file and directory typically also has metadata associated therewith, specifying various things, such as the data blocks that constitute the file or directory, the date of creation of the file or directory, etc. The content and format of this metadata, for the file system 64 and for the individual files and directories, varies substantially between different file systems. Many existing file systems are amply documented so that they can be used and modified as described herein by a person of skill in the art, and any such file system may be used in implementing the invention.

The DSU 30 includes one or more data entities 34. The data entity 34 may be any of a number of data units on file system 64 including, but not limited to, the file system 64 itself, a file, a file descriptor, a block bitmap, and the like. Associated with the data entity 34 is a lock 36. To access to a data entity 34, a server 12 must gain control of the respective lock 36. The acquisition of a lock may be achieved in a number of ways, including as described in U.S. patent application Ser. No. 10/773,613, which is incorporated by reference herein. Thus, to change the configuration data of the file system 64, such as by allocating a new block, a computing entity must become the owner of the file block bitmap's lock. To change the configuration data of a directory within the file system 64, such as by adding a new sub-directory, a computing entity must then become the owner of the lock that controls the respective directory. To change the data in a file within the file system 64, a computing entity must then become the owner of the lock that controls the respective file. Also, just to read the data in any such data entity, a computing entity must become the owner of the lock that controls the respective data entity. An exception to this, however, is that a computing entity generally has both read and write access to the locking metadata described herein for any of the data entities 34, even if another computing entity 12 controls the lock 36 for such data entity 34.

The lock 36 may have a number of fields. Of particular significance, the lock 36 may include an owner field 38, an address field 40, a version field 42 and, a liveness field 43. The owner data field 38 may be data that is used to identify a server 12 that owns or possesses the lock 36. For example, each of the servers 12 may be assigned a unique ID value, which could be inserted into the owner field 38 to indicate that the respective server 12 owns the lock 36 for the file system 64. A unique ID value need not be assigned manually by a system administrator, or in some other centralized manner. Instead the ID values may be determined for each of the servers 12 in a simpler, more automated manner, such as by using the server's IF address or MAC (Media Access Control) address of the server's network interface card, by using the World Wide Name (WWN) of the server's first HBA or by using a Universally Unique Identifier (UUID). A value of zero in the owner field 38 may be used to indicate that the lock 36 is not currently owned by any server 12, although other values may also be used for this purpose. In one embodiment, the owner field 38 is a 128 bit data region and is populated using a UUID generated by the kernel 78. Thus, setting all the 128 bits to zeroes indicates that the lock 36 is not currently owned by any server 12. The address field 40 may describe the location of the lock 36 in the address space of the file system 64. In one embodiment, the address field 40 is a 64-bit integer. The value contained in the version field 42 may be one of a number of different values, where the current value in the version field 42 (i.e., the current version) indicates a temporally unique current state of the lock 36. In one embodiment, lock version 42 is a monotonically increasing 64-bit integer value that is set to an initial value of zero at the time the file system 64 is created (formatted) on the data storage unit 30, and is incremented by one every time a disk lock 36 is acquired and released, as an atomic part of the acquisition and release process. It is appreciated that the version field 42 may be other sizes and may be adjusted/incremented by other values. The liveness field 43 indicates whether the current owner of the lock 36 as determined by the owner field 38 is powered on and actively using the lock 36. In one embodiment, the liveness field 43 is a 32-bit integer that is regularly updated with a time stamp by the server 12 that owns the lock 36. The actual update of the liveness field 43 may be achieved in a number of ways, including as described in U.S. patent application Ser. Nos. 10/773,613 and 11/676,109, both of which are incorporated by reference herein.

Figure 6:
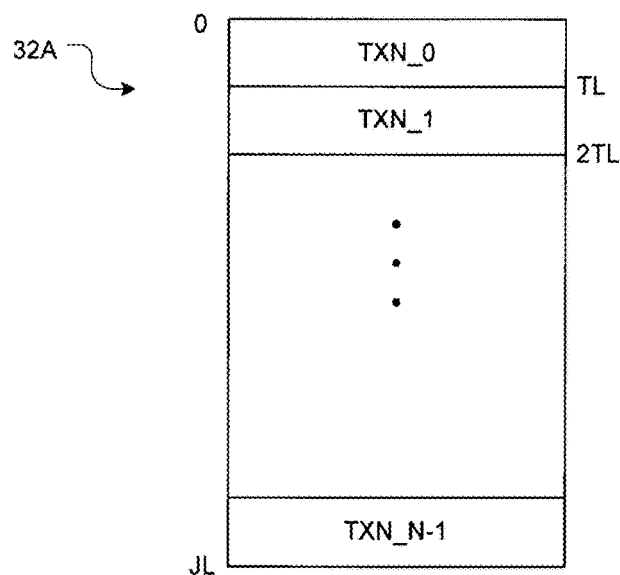
FIG. 6 illustrates a data structure of a journal, in accordance with various embodiments of the present invention.

The DSU 30 also includes a plurality of journals $32_1$-$32_M$ for recording transactions for the servers 12. As indicated, the journals may be a part of the file system 64 (e.g., journals $32_{N+1}$-$32_M$) or they may be separate from the file system 64 (e.g., journals $32_1$-$32_N$). FIG. 6 illustrates the data structure of a journal 32A, in accordance with various embodiments of the present invention. The journal 32A has a journal length of JL, which may be fixed or variable. The journal 32A also includes N transactions TXN_0 through TXN_N−1. As used herein, a transaction shall refer to any record of metadata change that is written out in a journal 32A. The transactions TXN_0 . . . TXN_N−1 each have a length TL. The order in which transactions TXN_0 . . . TXN_N−1 appear in the journal 32A is not necessarily the order in which they are executed on disk. For example, slots for fully committed transactions in a fixed length journal are recycled to hold new transactions. Although journal 32A is illustrated herein as having fixed length transactions, it is appreciated that other embodiments are possible that implement variable-length transactions.

The transactions TXN_0 . . . TXN_N−1 may contain "undo information" which may be used to roll-back a partially committed metadata change to a previous consistent state. In one embodiment, "undo information" stores the original values of the metadata region being modified. Similarly, recording "redo information" is useful to roll-forward a partially committed metadata change to its complete consistent state. In one embodiment, "redo information" stores the new values of a metadata region being modified.

Figure 7:
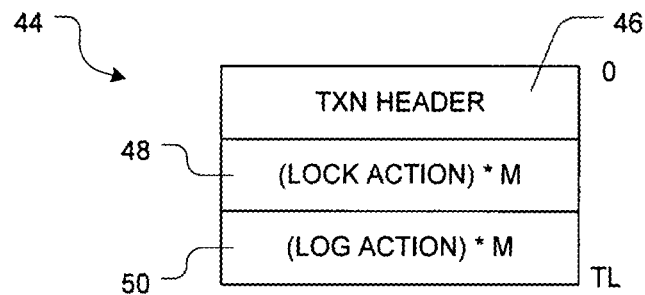
FIG. 7 illustrates a data structure of a transaction, in accordance with various embodiments of the present invention.

FIG. 7 illustrates a data structure of a transaction 44, in accordance with various embodiments of the present invention. The transaction 44 may contain a header region 46, which may be a metadata region that describes the transaction. Fields contained within the header 46 may include, but are not limited to, a "heartbeat" generation field, a transaction ID, a checksum, a length, a count of the number of lock actions 48 and log actions 50, a timestamp, etc. A description of an example "heartbeat" can be found in U.S. patent application Ser. No. 11/676,109, which has been incorporated by reference herein, and need not be discussed at length here. Although transaction 44 is illustrated herein in the context of the file system 64, it is appreciated that other embodiments are possible that implement transaction 44 for a distributed database system or any other structured data system.

The transaction 44 also has a number of lock actions 48 and log actions 50. The lock actions 48 store information about the disk locks 36 that one or more log actions 50 in the transaction 44 depend on. In particular, the lock action 48 may store the lock address 40 and the current lock version 42 for a required disk lock 36 that is currently owned by the server 12 that is executing the transaction 44. Log actions 50 are metadata or data updates to the file system 64 as part of the transaction 44. A log action 50 may be used, for example, to record old and/or new metadata values to roll back and/or roll forward.

Figure 8:
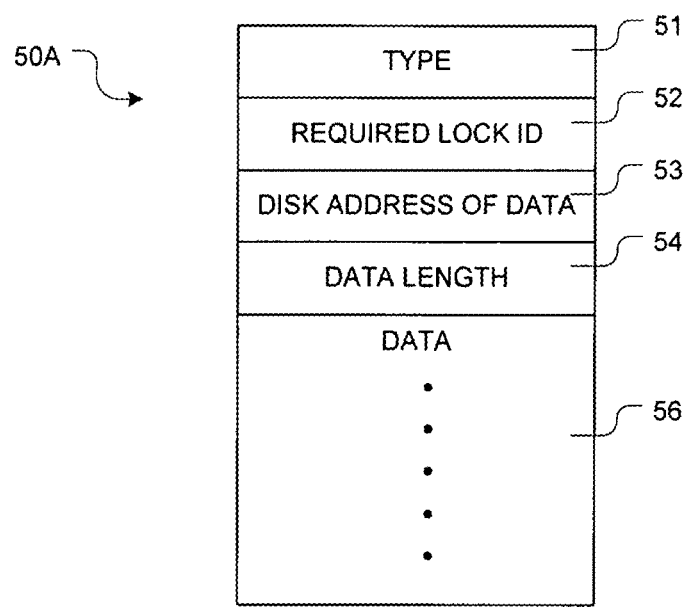
FIG. 8 illustrates a data structure for a log action, in accordance with various embodiments of the present invention.

FIG. 8 illustrates a data structure for a log action 50A, in accordance with various embodiments of the present invention. The log action 50A includes a metadata/data field 56, which contains an updated version of the data that is to be patched to a data entity 34 in the file system 64. The log action 50A may also include a type field 51 for describing properties of the metadata/data update. This may be for the benefit of interpreting the contents of a transaction 44 after the fact (e.g., when the transaction needs to be replayed post-crash). In one embodiment, the type field 51 may store the type of metadata/data that is contained within a given location. For example, the type field 51 may indicate that the data 56 is a file descriptor by indicating the log action type as "file_descriptor_update". Similarly, a log action to write out to a block bitmap could be "file_block_bitmap_update". The log action 50A may include a required lock ID field 52 for indicating which in the list of lock actions 48 the corresponding metadata update depends on. For example, in updating a file descriptor and a block bitmap, there would be two log actions—one to update the file descriptor and one to update the bitmap. The log action to update the file descriptor will be dependent on the file descriptor lock, and the log action to update the block bitmap will similarly be dependent on the block bitmap lock. It follows that there will be two lock actions 48—one for the block bitmap lock and one for the file descriptor lock. For instance, if the block bitmap lock is registered as a lock action with the transaction before the file descriptor lock, then the block bitmap update log action has a required lock ID 0. Similarly, the file descriptor update log action will have a required lock ID 1. It follows that values of the required lock ID field 52 are in the range of 0 to M−1. In one embodiment, the required lock ID field 52 has a size of 32 bits. The log action 50A may include a data address field 53 for indicating the location of the data 56 in the address space of the file system 64. The log action 50A may also include a data length field 54 for describing the length of the data 56. Thus, the updated data 56 is intended to be patched to the extent in file system 64 described by <offset=data address field 53, length=data length field 54>.

Exemplary Distributed Transaction System Operations

The following discussion sets forth in detail the operation of present technology for a distributed transaction system. With reference to FIGS. 10-18, flowcharts 1000, 1025A, 1030A, 1035A, 1040A, 1048A, 1600, 1700, and 1740A each illustrate example steps used by various embodiments of the present technology for a distributed transaction system. Flowcharts 1000, 1025A, 1030A, 1035A, 1040A, 1048A, 1600, 1700, and 1740A include processes that, in various embodiments, are carried out by a processor under the control of computer-readable and computer-executable instructions. The computer-readable and computer-executable instructions may reside, for example, in data storage features such as storage system 16 of FIG. 2. The computer-readable and computer-executable instructions are used to control or operate in conjunction with, for example, processing units on servers 12 of FIG. 3. Although specific operations are disclosed in flowcharts 1000, 1025A, 1030A, 1035A, 1040A, 1048A, 1600, 1700, and 1740A, such operations are examples. That is, embodiments are well suited to performing various other operations or variations of the operations recited in flowcharts 1000, 1025A, 1030A, 1035A, 1040A, 1048A, 1600, 1700, and 1740A. It is appreciated that the operations in flowcharts 1000, 1025A, 1030A, 1035A, 1040A, 1048A, 1600, 1700, and 1740A may be performed in an order different than presented, and that not all of the operations in flowcharts 1000, 1025A, 1030A, 1035A, 1040A, 1048A, 1600, 1700, and 1740A may be performed. Where helpful for the purposes of illustration and not for limitation, FIGS. 10-18 will be described with reference to FIG. 9, which illustrates a hypothetical situation in which embodiments may be implemented.

Figure 9:
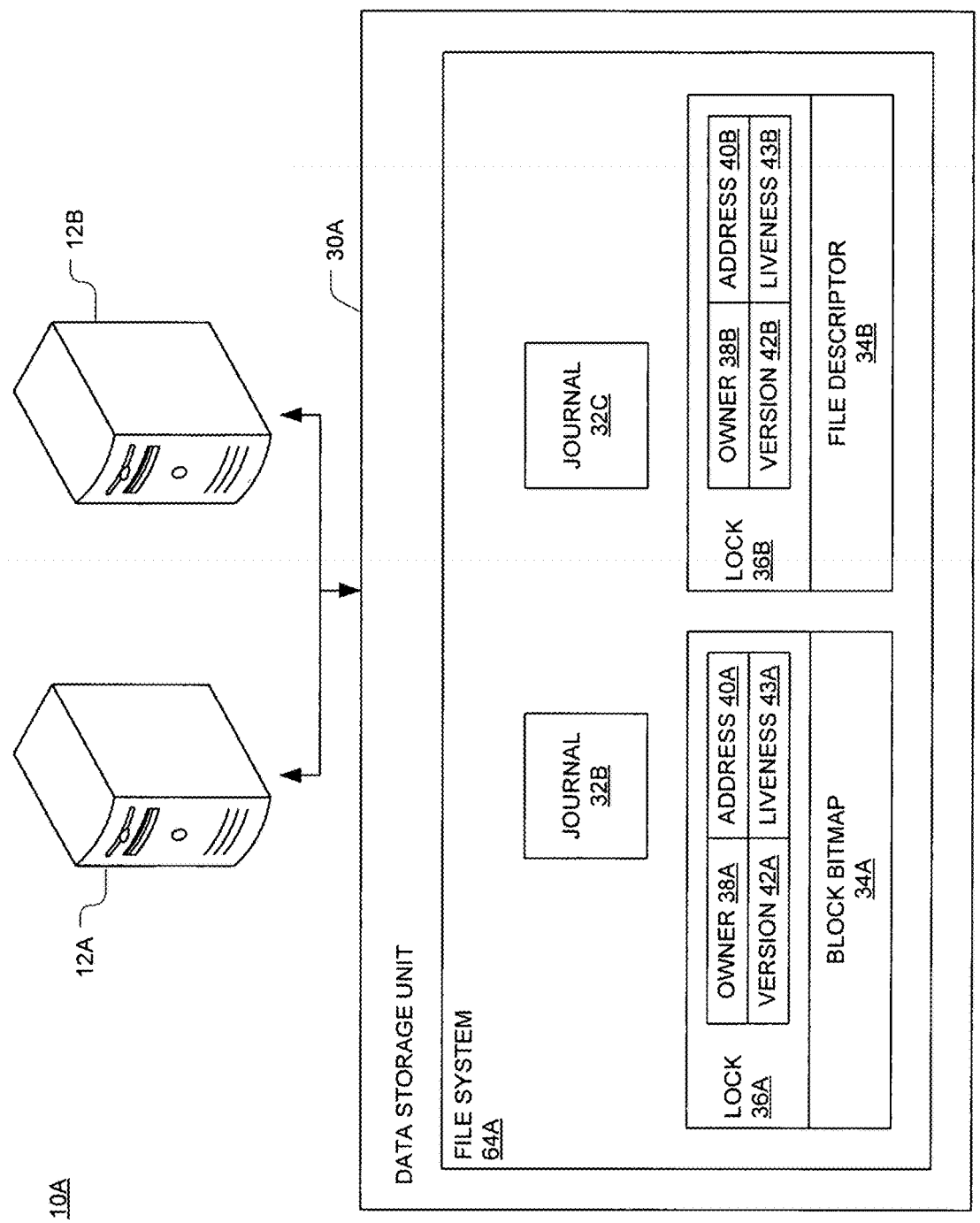
FIG. 9 illustrates a hypothetical situation in which embodiments may be implemented.
Figure 10A:
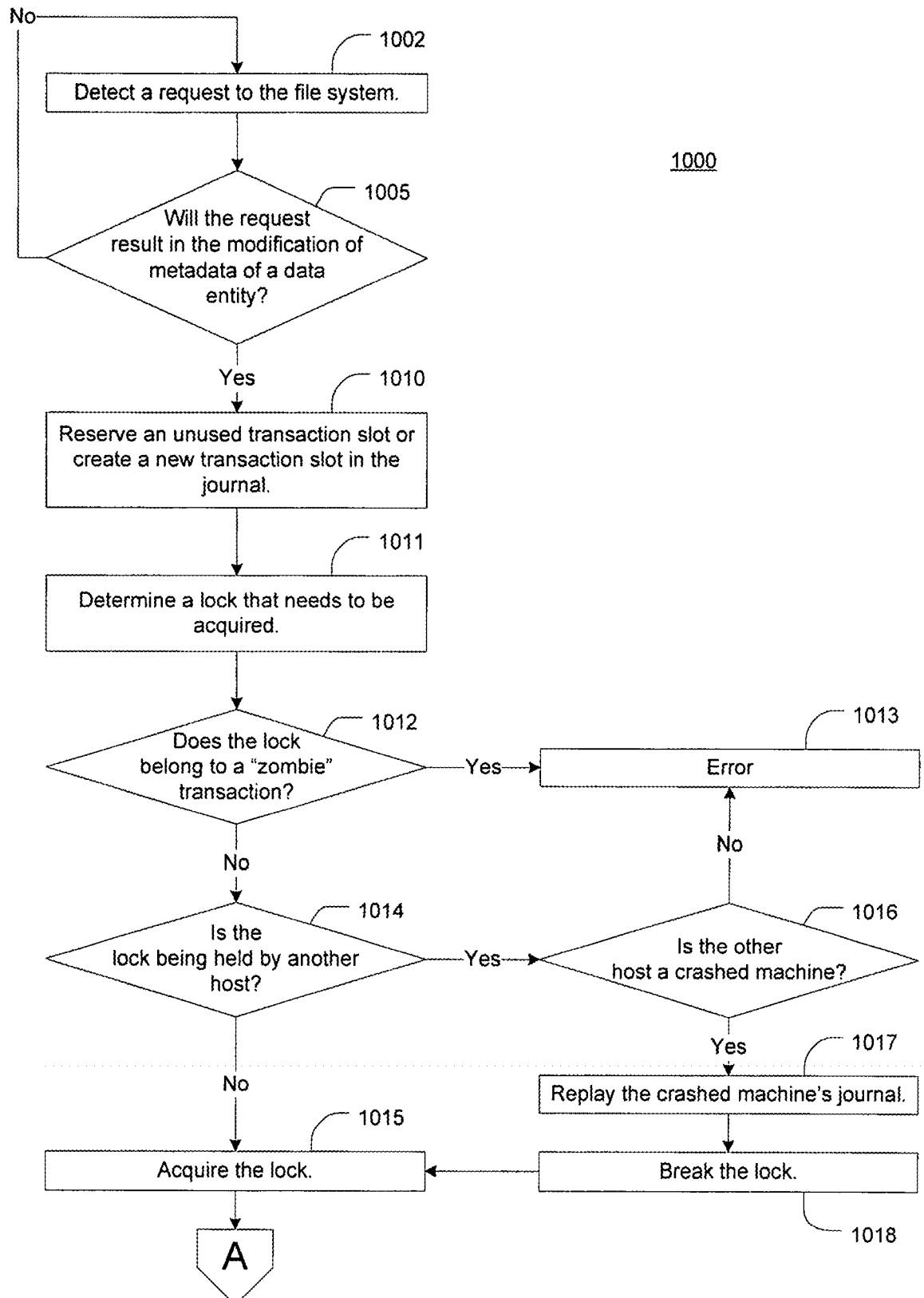
FIGS. 10A-10C illustrate a flowchart for a process for maintaining a transaction journal in a distributed transaction system, in accordance with various embodiments of the present invention.
Figure 10B:
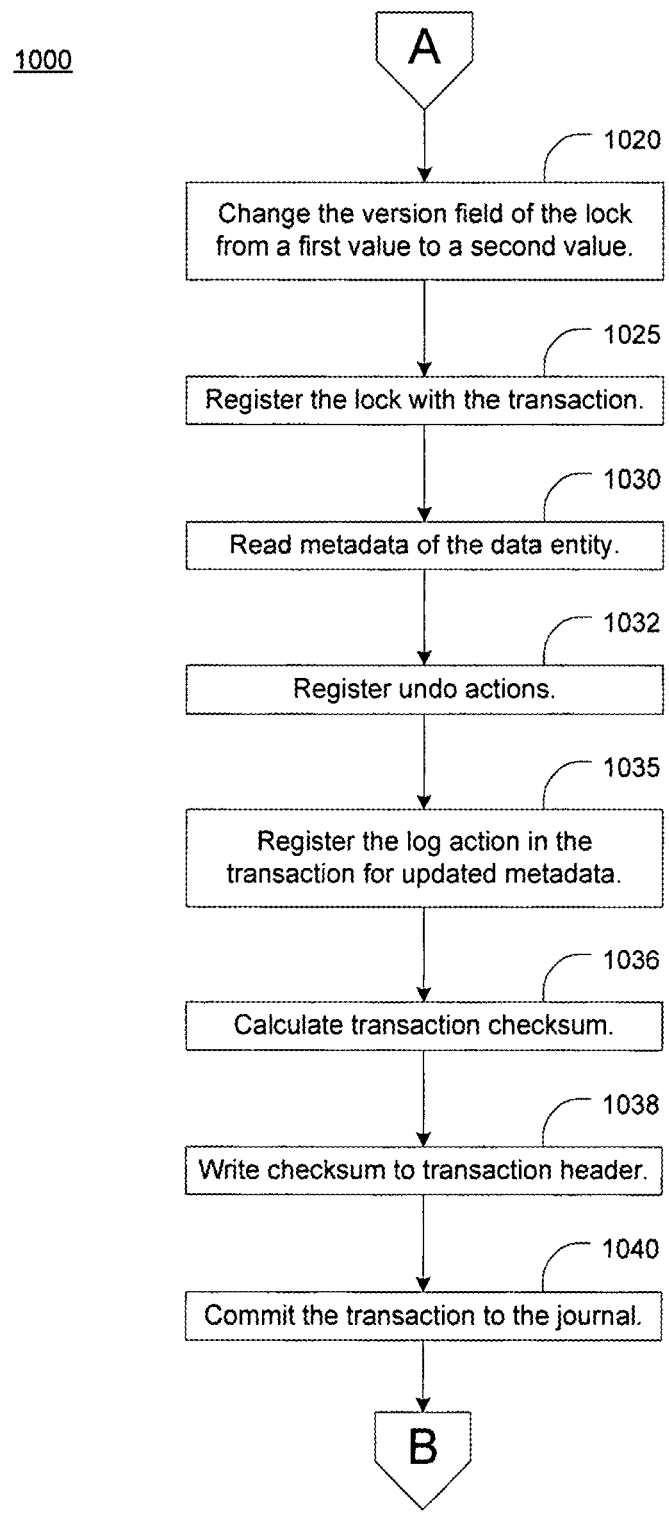
Figure 10C:
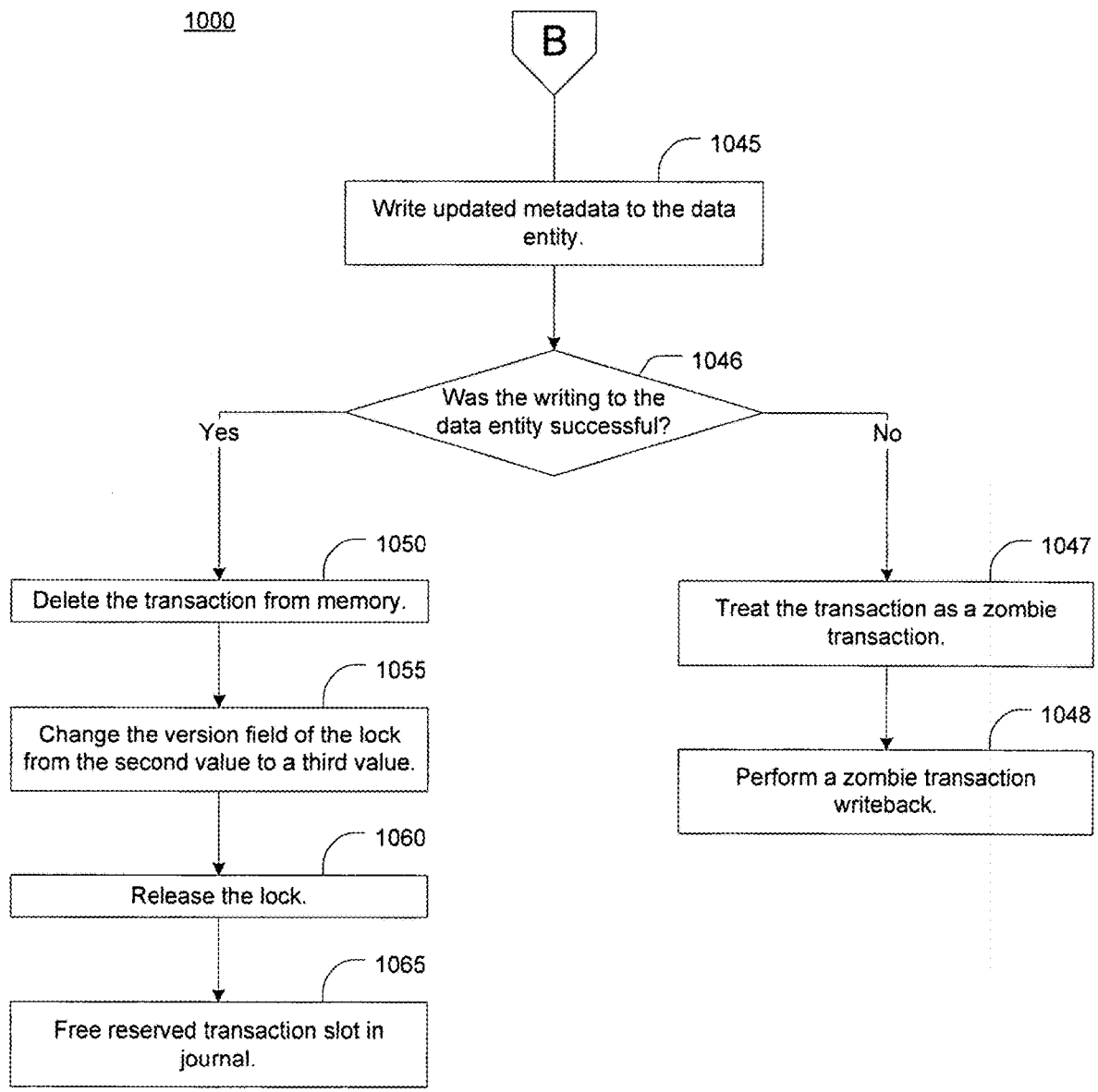

FIGS. 10A-10C illustrate a flowchart 1000 for a process for maintaining a transaction journal in a distributed transaction system, in accordance with various embodiments of the present invention. In one embodiment, flowchart 1000 begins at block 1002 wherein a request to the file system 64A is detected. At block 1005, a determination is made as to whether the request would result in the modification of the metadata of a data entity. With reference to FIG. 9, this may involve, for example, server 12A needing to allocate an additional block to a file corresponding to the file descriptor 34B. It should be appreciated that far more complex operations may also be performed. Before such a change is physically made to the file on the file system 64A, the server 12A must first record the transaction in its journal 32B for crash recovery purposes. The data structure of journal 32B may be similar to that of journal 32A of FIG. 6. In terms of size, the journals 32 may be implemented in a number of different ways. For example, the journals 32 may have a fixed size, such that they can hold a certain number of transactions. Alternatively, the journals 32 may have dynamic size such that transaction slots can be dynamically allocated on-the-fly. Thus, block 1010 involves reserving an unused transaction slot or creating a new transaction slot in the journal 32B. In the case where the journal 32B has a fixed size and all transaction slots are in use, server 12A may be blocked temporarily until a transaction slot frees.

At block 1011, a determination is made as to which locks need to be acquired. For example, in order to allocate a new block to the file, server 12A must gain access to the file descriptor 34B of the file and also the block bitmap 34A of the file system 64A. In other words, server 12A needs to update block bitmap 34A to allocate a previously unallocated block. The file descriptor 34B then needs to be updated so that it points to the newly allocated block. To do so, the server 12A must acquire locks 36A and 36B corresponding to the metadata resources that will be written to in the transaction. Before acquiring a lock, the server 12A first checks whether the lock belongs to a "zombie" transaction (block 1012). Generally speaking, a zombie transaction is a transaction that has been successfully committed to a journal, but whose metadata updates to data entities are outstanding. If the transaction is a zombie transaction, then an error has occurred (block 1013). Further description of zombie transactions may be found below with reference to FIG. 15. If the transaction is not a zombie transaction, a determination is made as to whether the lock is being held by another host (block 1014). This may involve, for example, server 12A determining which server 12 is identified by the owner field 38A of the lock 36A. If the lock is not being held by another server, the lock is acquired (block 1015). The acquisition of a lock may be achieved in a number of ways, including but not limited to methods as described in U.S. patent application Ser. No. 10/773,613, which is incorporated by reference herein.

If the lock is being held by another server (e.g., server 12B), a determination is made as to whether the server 12B has crashed (block 1016). Whether or not the server 12B has crashed may be determined, for example, by examining the liveness field 43A of the lock 36A. If the server 12B has not crashed, then an error has occurred (block 1013). If the server 12B has crashed, then server 12A may replay the journal 32C of server 12B (block 1017). A more detailed description of replaying a journal can be found below with reference to FIGS. 17-18. Subsequently, the lock 36A is broken with respect to server 12B (block 1018) and then acquired by server 12A (block 1015).

Once the locks 36A and 36B have been acquired, block 1020 involves changing the version fields 42A and 42B from first values to second values. In one embodiment, this may involve simply incrementing the values in the version fields 42A and 42B. For example, assume that prior to acquisition lock 36A was version 5 and lock 36B was version 9. Upon acquisition, server 12A then changes the version field 42A of lock 36A to 6 and the version field 42B of lock 36B to 10. In a preferred embodiment, changing the version field 42A of lock 36A is combined with the disk write corresponding to changing the owner field 38A to indicate ownership of the lock 36A by server 12A.

Next, the server 12A may begin to create the transaction. The transaction may have a structure, for example, similar to transaction 44 of FIG. 6. The following discussion will periodically refer to transaction 44 of FIG. 6 for purposes of illustration only, and not for limitation. The transaction 44 can be stored in memory until a later time 1040 for efficiency reasons. Other embodiments are possible wherein the transaction header 46, lock actions 48, and log actions 50 are synchronized to the journal 32A on disk immediately on creation in blocks 1010, 1025 and 1035. Embodiments provide for a way to detect incomplete transactions in the journal by storing a checksum in the transaction header 46. In other words, if a server 12A crashes before committing the transaction at step 1040, a server 12, at a later point in time, can disregard the incomplete transaction because of a checksum mismatch in the transaction header 46.

Figure 11:
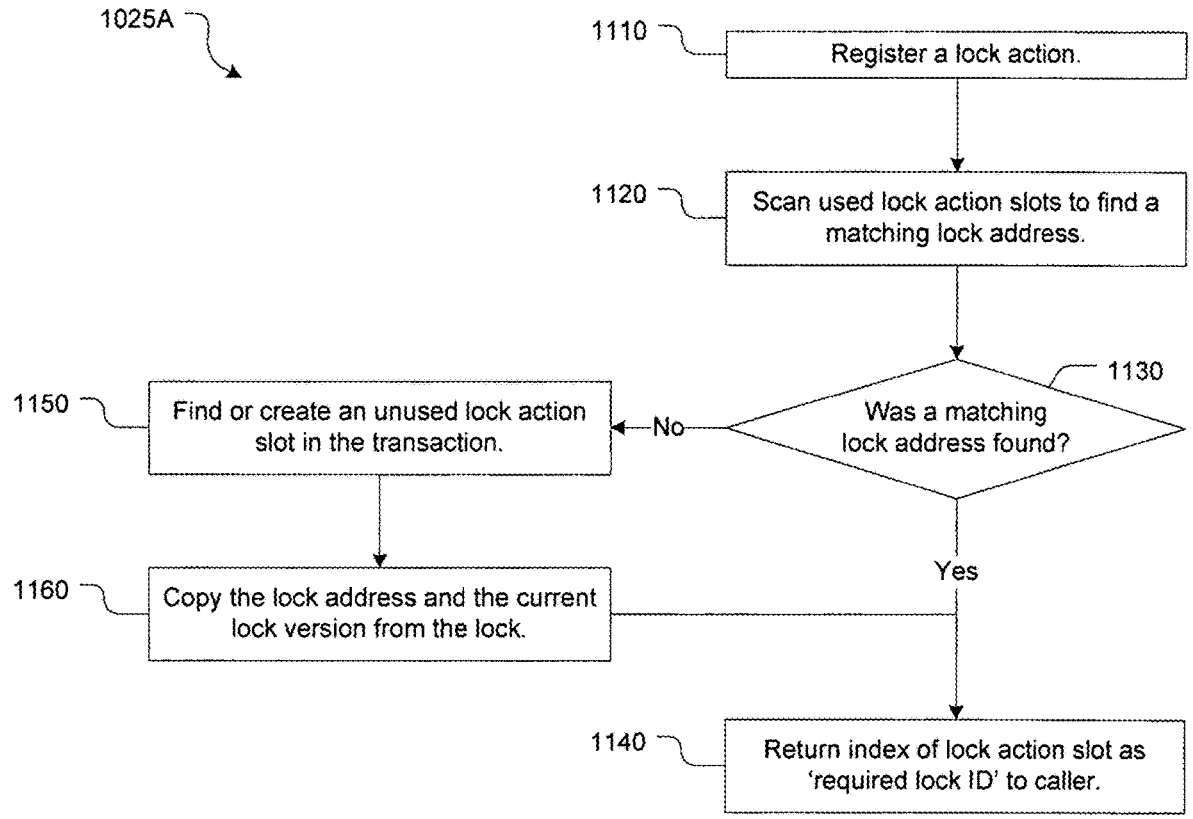
FIG. 11 illustrates a flowchart for a method of registering a lock with a transaction, in accordance with various embodiments of the present invention.

At block 1025, one or more locks (e.g., lock 36A and lock 36B) are registered with the transaction. It should be appreciated that this may be achieved a number of ways. For example, FIG. 11 illustrates a flowchart 1025A for a method of registering a lock with the transaction, in accordance with various embodiments of the present invention. At block 1110, the appropriate lock actions are registered. As described above, lock actions contain information that describes the locks on which a particular transaction depends. At block 1120, the lock action slots 48 of the transaction 44 are scanned to find matching lock addresses (e.g., address 40A or address 40B). As will become apparent after further discussion, if the lock action is found with a matching lock address, the corresponding lock version will implicitly match. If a matching lock address is found (decision block 1130), the index of the lock action is returned to the caller as the required lock ID 52 (block 1140). If a matching lock address is not found, flowchart 1025A proceeds to block 1150, which involves finding or creating an unused lock action slot 48 in the transaction 44. For the purposes of the hypothetical of FIG. 9, it will be assumed that the lock action slots 0 and 1 will be used. At block 1160, the lock address and the current lock version are copied from the lock. For example, address 40A and version field 42A (e.g., version 6) are copied to lock action 0 and address 40B and version field 42B (e.g., version 10) are copied to lock action 1. The index of a newly registered lock action is returned to the caller for subsequent use in the required lock ID field 52 of a log action 50 that depends on the lock action 48 (block 1140). For example, 0 will be returned in response to registering lock action for lock 36A and 1 will be returned in response to registering lock action for lock 36B.

With reference again to FIGS. 10A-10C, once the locks are successfully registered, the metadata of the data entities is read (block 1030). For example, the metadata of block bitmap 34A and file descriptor 34B are read into the memory of server 12A. Since metadata changes are not committed to the disk until after the transaction has been committed, a mechanism may be necessary to avoid reading stale metadata from the disk. For instance, a function may register a log action to delete a directory entry from disk (i.e., zero it out). At the same time, another function in the same transaction context may want to read from the region on disk that corresponds to the deleted directory entry. If the read is allowed to proceed to disk, it will read the old directory entry, which would not have occurred if all log actions corresponding to directory updates in the current transaction were already committed to this point.

Figure 12:
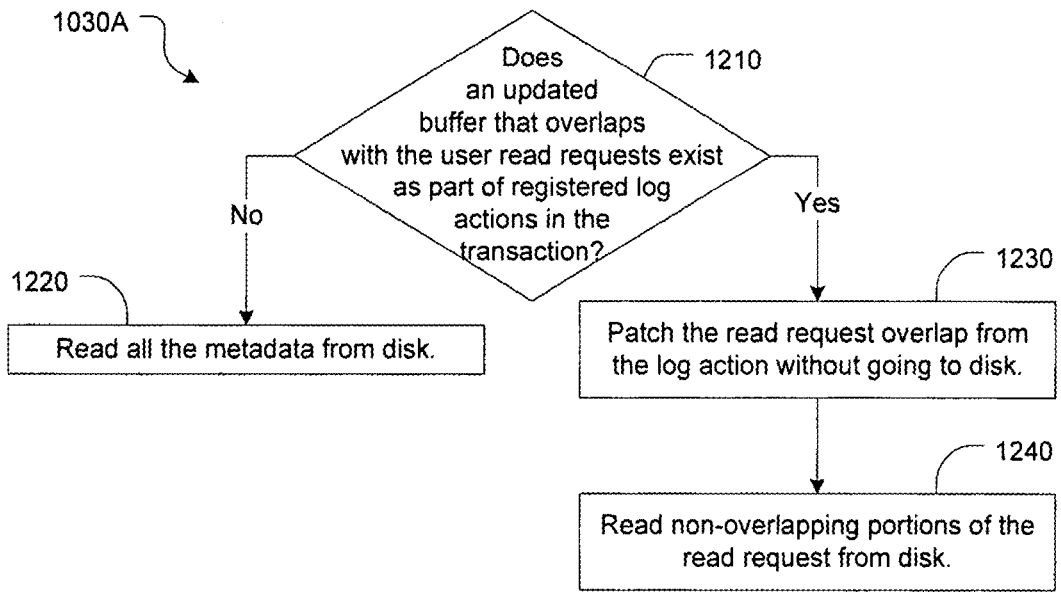
FIG. 12 illustrates a flowchart of a process for reading metadata of a data entity, in accordance with various embodiments of the present invention.

It should be appreciated that accounting for stale metadata may be achieved in a number of ways. For example, in one embodiment, this may be achieved by writing undo actions to the transaction on disk and, on success, writing each metadata update to the disk immediately after registering a log action 50 for the updated metadata in the transaction 44. Thus, in the event that an error occurs, the undo actions from the transaction can be used to roll back metadata updates on disk. This approach requires extra writes to disk to store undo actions in the transaction. In another embodiment, metadata reads to the file system 64 are trapped by server 12 before they are issued to disk. FIG. 12 illustrates a flowchart 1030A of a process for reading metadata of a data entity including trapped metadata reads, in accordance with various embodiments of the present invention. At block 1210, in response to a user request to read from a specific offset in the file system 64, a determination is made as to whether an updated buffer that overlaps with the user read request exists as part of registered log actions 50 in the transaction 44. If no, then the metadata is simply read from the disk (block 1220). If yes, the read request overlap from the log action is patched without going to disk (block 1230) and the non-overlapping portions of the read request are read from disk (1240).

Figure 13:
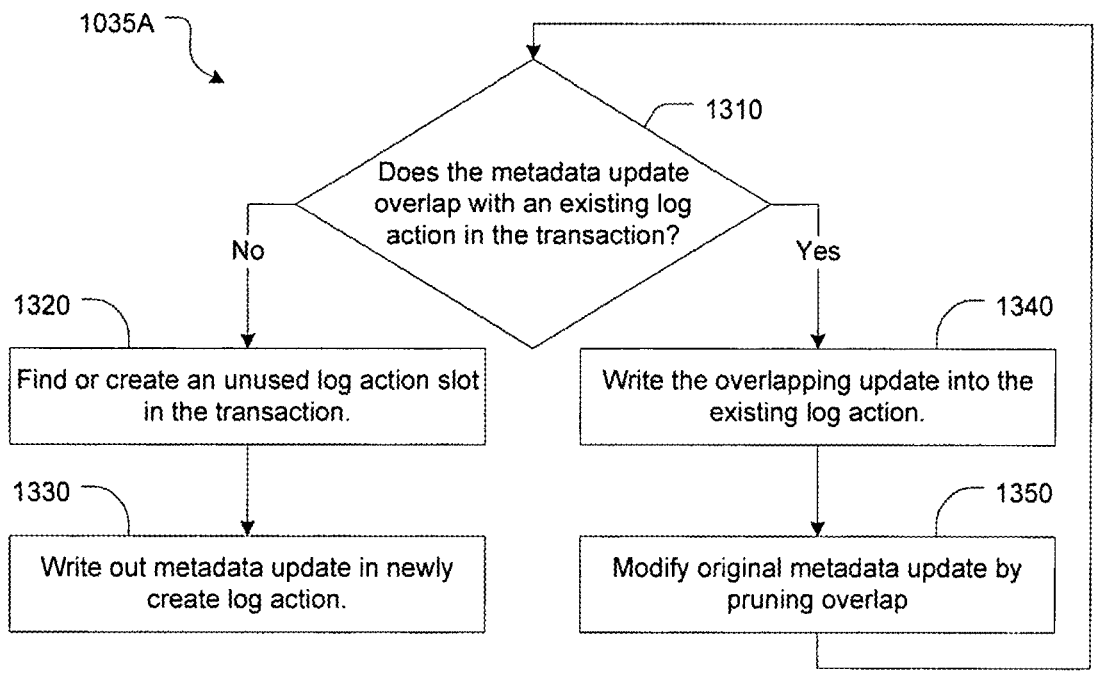
FIG. 13 illustrates a flowchart of a process for registering a log action in a transaction based on updated metadata, in accordance with various embodiments of the present invention

In one embodiment, once the metadata has been read from the data entities, undo actions are registered as an undo stack in the transaction 44 so that file system 64 can be rolled back to its previous state if necessary (block 1032). Next, the updated metadata is registered in the transaction as log actions (block 1035). This may be done in a number of ways. For example, FIG. 13 illustrates a flowchart 1035A of a process for registering a log action, in accordance with various embodiments of the present invention. At block 1310, in response to a request to update metadata of a certain data length of a data entity at a certain disk address in the file system 64, a determination is made as to whether the metadata update overlaps with an existing log action in the transaction. If no overlapping log action is found, flowchart 1035A proceeds to block 1320, which involves finding or creating an unused log action slot 50 in the transaction 44. At block 1330, the metadata update is copied to the data field 56 of the log action and other fields of the log action are updated. For example, with reference again to the hypothetical of FIG. 9, in the log action corresponding to update of the block bitmap 34A, the log action type field 51 is set to "file block bitmap update", Required Lock ID field 52 is set to 0, Disk Address of Data field 53 is set to the file system offset of the bits in the block bitmap 34A that are being updated, and Data Length field 54 is set to the number of bytes changed in the update. If an overlapping log action is found, the metadata update overlap is patched into the existing log action (block 1340) and the overlap is pruned from the original metadata update to create a modified update (block 1350). The modified update then proceeds back to the block 1310 as a metadata update.

By way of illustration, a "plain English" log action for the hypothetical of FIG. 9 may resemble the following:

<start>
<Change bits #0-7 in bitmap 34A from 0000 0000 to 0010 0000, depends on lock 36A version 6>
<Change address #4 in file descriptor 34B to point to block #2, depends on lock 36B version 10>
<end>

As a result of the above operations, block #2 (represented by bit #2 in block bitmap 34A) becomes allocated space and file descriptor 34B will point to block #2. Thus, a new block will be allocated to the file associated with file descriptor 34B by server 12A. Although flowchart 1000 is illustrated herein as a serialized process of lock acquisition, registering lock actions, reading metadata, updating metadata and registering log actions, it is appreciated that other embodiments are possible that execute blocks 1011 through 1035 as concurrent operations, each concurrent operation dealing exclusively with a distinct lock 36 and data entity 34 that is part of the transaction. Further, embodiments provide for such concurrent operations to acquire locks, register lock actions, read metadata, update metadata and register log actions in no particular order.

It should be appreciated that transactions 44 for complex actions such as increasing the length of a file by a large amount may go through multiple function calls, and each function may try to add its own metadata actions to the transactions 44. This may cause the transaction 44 to overflow (run out of space to accommodate log actions 50) before reaching the end of the callstack. Further, at the beginning of a complex action, some metadata updates that must make it to the transaction 44 for the action to complete are usually known. For example, when increasing the length of a file, it is known at the very outset that the length and timestamp fields in the file descriptor 34B will need to be updated at the very end. In other words, the file descriptor 34B will need to be registered in a log action 50 at the very end. Hence, space in the transaction log action region 50 having a size sizeof(file_descriptor) can be reserved for later use.

With reference again to FIGS. 10A-10C, a transaction checksum is subsequently calculated (block 1036) and written to the transaction header 46 (block 1038). The checksum may be calculated based on, for example, the transaction header, the used lock action slots, and the used log action slots. In one embodiment, the checksum is used to determine whether the transaction is consistent at a later point in time (e.g., when the transaction is replayed).

Figure 14:
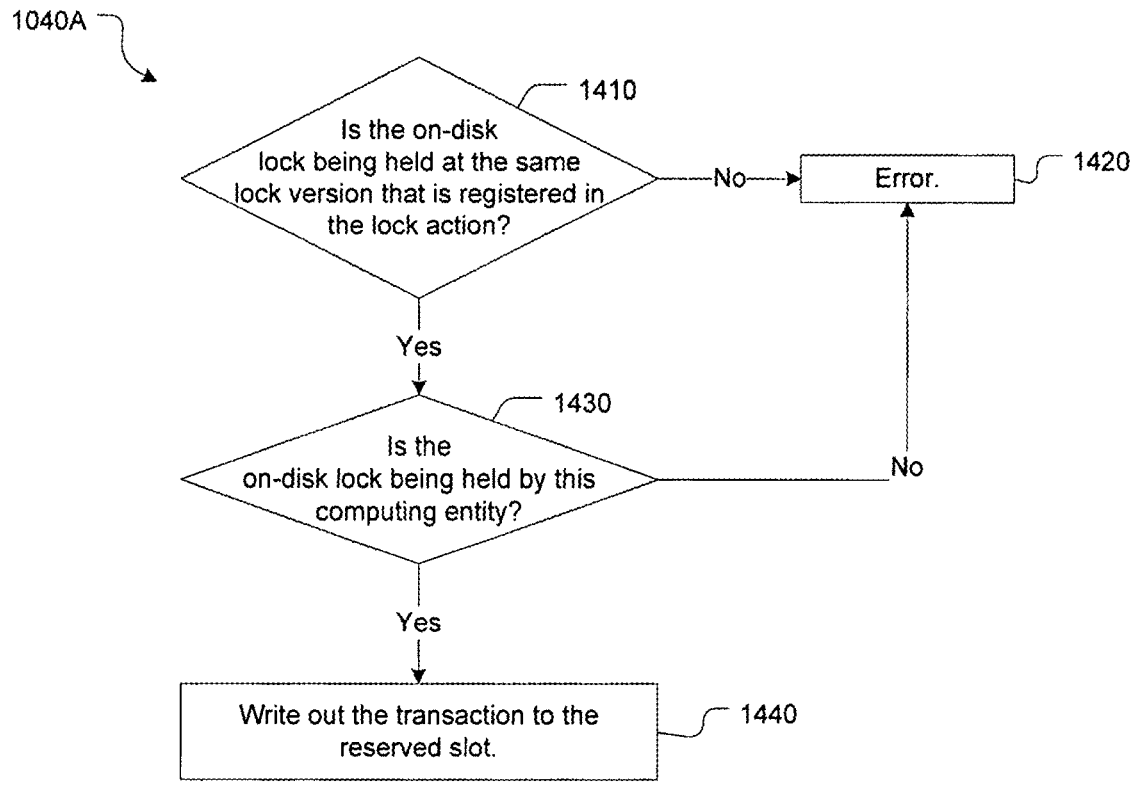
FIG. 14 illustrates a flowchart of a process for committing a transaction to a journal, in accordance with various embodiments of the present invention.

At this point, the metadata operations have not actually taken place, but rather they have simply been written to a transaction in memory. Thus, block 1040 involves actually committing the transaction to the journal 32B. In some cases, it may be beneficial to first run a validity check before committing the transaction. FIG. 14 illustrates a flowchart 1040A of a process for committing a transaction to a journal, including a validity check, in accordance with various embodiments of the present invention. At block 1410, a determination is made as to whether the on-disk lock (e.g., lock 36A or lock 36B) is being held at the same lock version (e.g., version 6 or version 10 respectively) that is registered in the corresponding lock action. If not, then an error has occurred (block 1420) and the transaction has potentially been compromised. If yes, then flowchart 1040A proceeds to block 1430, where a second determination is made as to whether the on-disk lock is being held by the present computing entity (e.g., server 12A). If no, an error has occurred (block 1420). If yes, then the transaction is written out to the reserved slot in the journal (block 1440).

With reference again to FIGS. 10A-10C, once the transaction has been successfully committed to the journal 32B, the updated metadata 56 contained in log actions 50 may then be written to the appropriate data entities (block 1045). In other words, server 12A may then write the updated metadata to block bitmap 34A and file descriptor 34B. It is appreciated that a situation may arise where the transaction is successfully committed to the journal on disk, but I/O failures are encountered when executing the metadata update. For example, a cable connecting server 12A to a storage area network, and thus to the data storage unit 30A, may become faulty or unplugged. From the point of view of server 12A and server 12B, server 12A technically has not crashed because it is still functional and able to communicate with server 12B over a local area network. However, the metadata updates are now mandatory since the transaction has been committed and is permanent on disk. Such transactions that are successfully committed to the journal but whose disk actions are outstanding are referred to as zombie transactions, on account of their intermediate states. Thus, if the writing to the data entity is unsuccessful (block 1046), the transaction is treated as a zombie transaction (block 1047).

Figure 15:
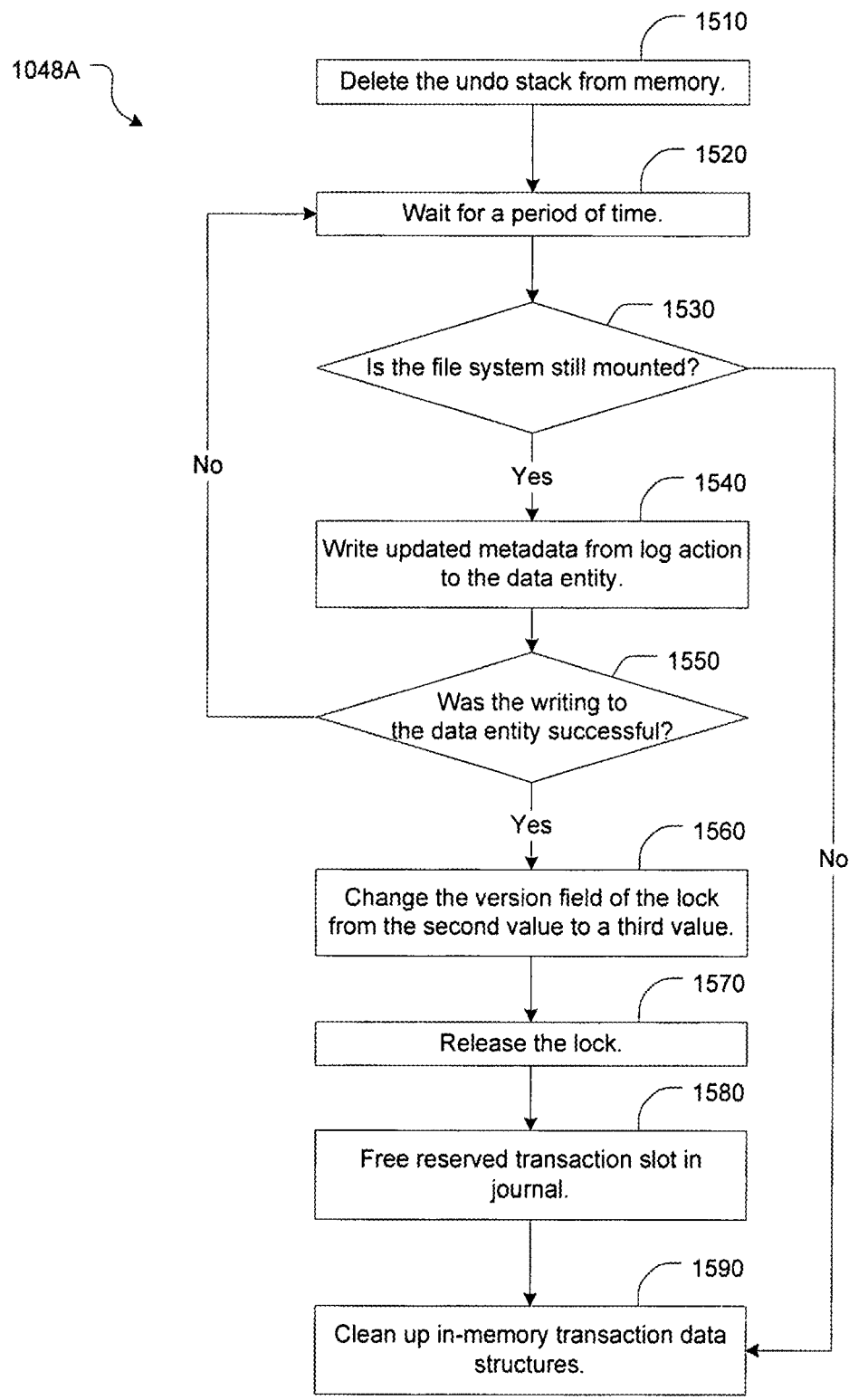
FIG. 15 illustrates a flowchart of a process for performing a zombie transaction writeback, in accordance with various embodiments of the present invention.

Zombie transactions may be handled a number of ways. For example, in one embodiment, server 12A may zero out the transaction that has been committed to disk. However, in the case where communication between the server 12A and the data storage unit 30A has been severed, this operation may be unsuccessful as well. Alternatively, server 12A may perform a zombie transaction writeback (block 1048). FIG. 15 illustrates a flowchart 1048A of a process for performing a zombie transaction writeback, in accordance with various embodiments of the present invention. At block 1510, the transaction's undo stack is deleted. In a preferred embodiment, retrying the transaction is delayed by a short interval of time (block 1520) to get past any intermittent error conditions that may have caused the initial write failure at block 1046. At block 1530, a determination is made as to whether the file system is still mounted. If not, in-memory transaction data may be cleaned-up/freed (block 1590). If the file system is still mounted, an attempt is made to write the metadata updates to the data entity 34A (block 1540). In other words, the data entity 34A is written out the file system 64A. At block 1550, a determination is made as to whether the write was successful. If not, flowchart 1048A returns to block 1520 (i.e., wait and retry writing the update). As indicated above, problems encountered with respect to writing to the file system 64A may be the result of a loss of connectivity to the DSU 30A. In one embodiment, when such a disconnect is detected, the server 12A is operable to suspend of switch off journaling functionality. This may involve, for example, canceling the active transactions in memory and cleaning up the journal state in memory. This effectively closes the journal until connectivity is restored. During this time, new transactions are not created while the journal is closed. Thus, the file system 64A (or database, etc.) would temporaly operate at a degraded level of service as opposed to full outage.

Assuming the writing from block 1540 was successful, the version field 42A of the lock 36A is changed from the second value to a third value (block 1560). At block 1570, the lock 36A is released. Thereafter, the reserved transaction slot is freed from the journal 32B (block 1580) and the in-memory data structures are cleaned up (block 1590).

With reference again to FIGS. 10A-10C, block 1050 involves deleting the transaction from memory. Since the metadata actions associated with the transaction have been successfully performed, the transaction may also optionally be deleted (i.e., zeroed in whole or in part) from the journal. Subsequent to writing the updated metadata to disk but prior to releasing any locks, the version fields of acquired locks are changed a second time from the second values to third values (block 1055). For example, server 12A may change the version field 42A of lock 36A from 6 to 7 and the version field 42B of lock 36B from 10 to 11. Subsequently, the locks are released (block 1060) and the previously reserved transaction slot is freed (block 1065).

In embodiments where optional deletion or zeroing of transactions upon successful transaction commit is not implemented, the journal may become filled with an excessive amount of successfully committed transactions. This will cause an elongation of the crash recovery process since a replaying host will at the very least have to check the lock versions contained in the lock actions against the current versions of the locks. Thus, in such a case, a periodic purging process may be run that effectively removes some or all successfully committed transactions from the journal. It is appreciated that this does not necessarily involve completely deleting the transactions, but rather may include simply zeroing out a portion of the transactions (e.g., the checksum field in the transaction header 46) so they are not recognized as valid transactions.

Figure 16:
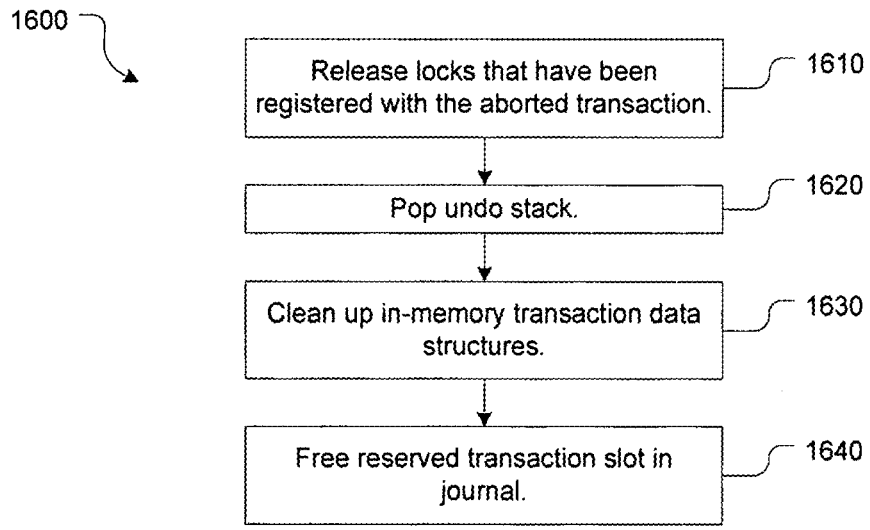
FIG. 16 illustrates a flowchart for a method of aborting a transaction, in accordance with various embodiments of the present invention.

If problems are encountered while performing the operations of blocks 1011 through 1040, it may be necessary to abort a transaction. In one embodiment, a mechanism is provided that allows for aborting a transaction and restoring in-memory state of on-disk data structures to a point in time just before the transaction took place. FIG. 16 illustrates a flowchart 1600 for a method, of aborting a transaction, in accordance with various embodiments of the present invention. At block 1610, locks that have been registered with the transaction are released. Next, the undo stack that was created as part of the transaction is executed (block 1620). Contents of undo actions as recorded in block 1032 are applied in last-in-first-out (LIFO) order to patch in-memory data entities and restore them to a past image before any metadata updates took place. In one embodiment, in-memory transaction data structures may then be cleaned up (block 1630). At block 1740, the transaction slot that was previously reserved in the journal is freed.

By changing the lock version of a lock upon the acquisition and upon the release of the lock, the different versions can then be used to define different states of the lock. For example, in the hypothetical presented, version 5 of lock 36A signals that the hypothetical transaction from server 12A has not yet been performed, version 6 of lock 36A signifies that the transaction is in-flight, and version 7 indicates that the transaction has been completed. Additionally, changing the value in the version field 42 creates implicit ordering of transactions without requiring the different hosts to communicate with and/or be aware of each other. For example, assume that prior to its acquisition by server 12A lock 36A is version 5. Once server 12A acquires lock 36A, the version field 42A may then change to version 6. Server 12A may then create a log action in journal 32B such as:

<Change bits #0-7 in bitmap 34A from 0000 0000 to 0010 0000, depends on lock 36A version 6>

Prior to releasing, server 12A may then change the version field 42A to version 7. Subsequently, server 12B may also acquire lock 36A. Upon acquisition, server 12B changes the version field 42A to version 8 and then creates the following log action in journal 32C:

<Change bits #0-7 in bitmap 34A from 0010 0000 to 0011 0000, depends on lock 36A version 8>

Prior to releasing, server 12B then changes the version field 42A to version 9. Subsequently, if a crash occurs and the current version of lock 36A is version 8, a machine replaying journals 32B and 32C would know based on the version field 42A that the above transaction from server 12A has been completed and that the above transaction from server 12B was in-flight at the time of the crash and thus needs to be replayed. It should be apparent from the above explanation that embodiments also provide implicit ordering for transactions from the same server irrespective of the order in which they appear in the journal. Two transactions that operate on the same resource will have different lock versions. In accordance with the examples presented with respect to FIG. 9, a lower lock version than the current lock version indicates an earlier (and thus successfully committed) transaction.

Figure 17:
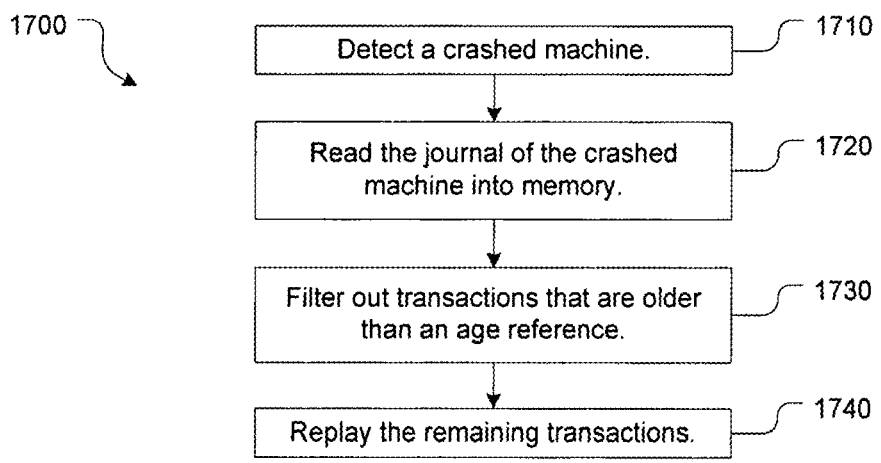
FIG. 17 illustrates a flowchart of a method for replaying a journal, in accordance with various embodiments of the present invention.

If server 12A happens to crash after a transaction has been committed to the journal 32B but before server 12A performs the metadata updates on disk, the journal 32B may need to be replayed by another computing entity (e.g., server 12B). FIG. 17 illustrates a flowchart 1700 of a method for replaying a journal, in accordance with various embodiments of the present invention. In one embodiment, flowchart 1700 begins at block 1710 when a crashed machine is detected. This may involve, for example, server 12B detecting a stale disk lock or stale heartbeat corresponding to server 12A. The mechanism for detecting a stale disk lock is disclosed in detail in U.S. patent application Ser. No. 10/773, 613, which is incorporated by reference herein. The mechanism for detecting a stale heartbeat is disclosed in detail in U.S. patent application Ser. No. 11/676,109, which is also incorporated by reference herein. Once such a stale lock or heartbeat is detected, it will point to journal 32B, which is read into memory (block 1720). At block 1730, transactions older than an age reference (e.g., the current version of version field 42A) are filtered out. Presumably, these transactions have already been completed and need not be repeated. It is appreciated that in embodiments where the version field 42A is not changed incrementally, other steps may be necessary to determine the age of the transaction. At block 1740, the remaining transactions are replayed.

Figure 18:
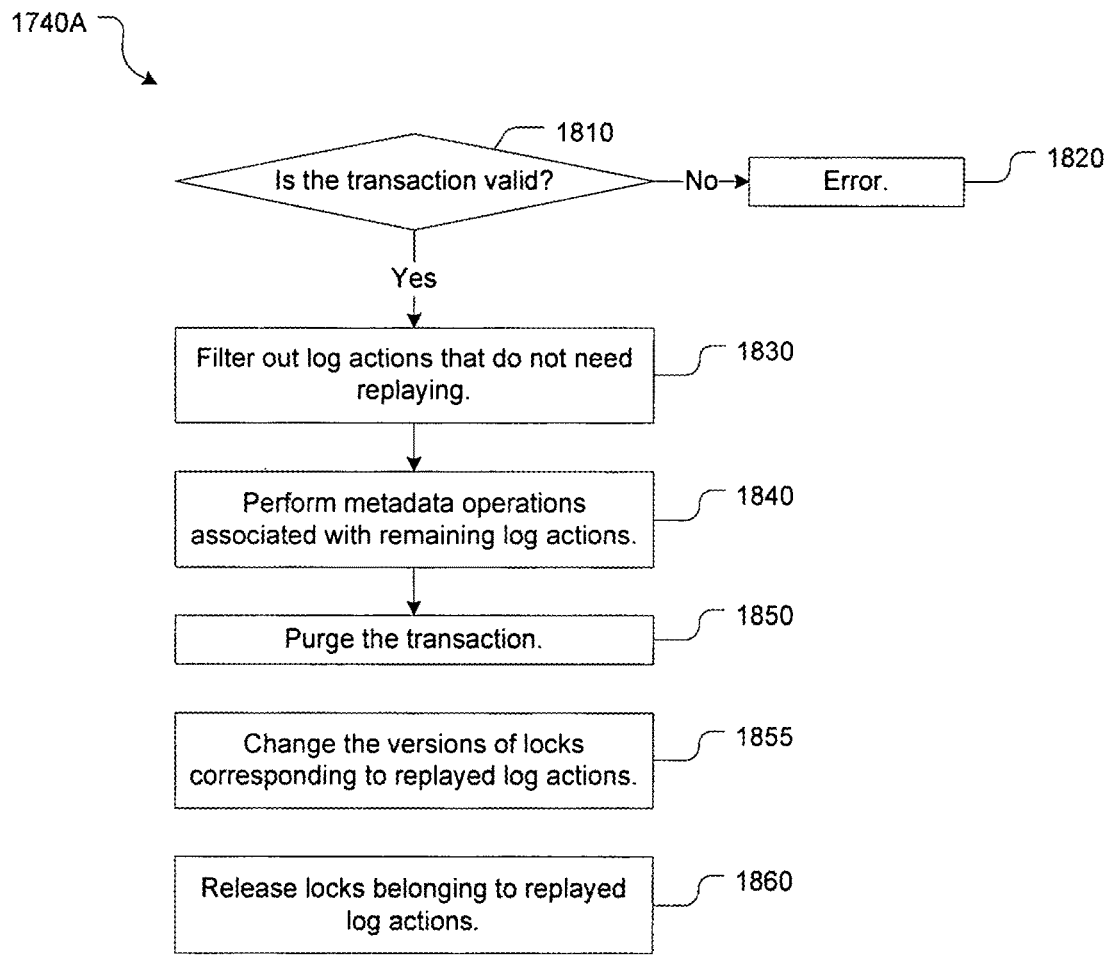
FIG. 18 illustrates a flowchart of a method for replaying a transaction, in accordance with various embodiments of the present invention.

It is further appreciated that replaying a transaction may be achieved a number of ways. For example, FIG. 18 illustrates a flowchart 1740A of a method for replaying a transaction, in accordance with various embodiments of the present invention. Flowchart 1740A may begin at block 1810, where a determination is made as to whether the transaction is valid. For example, transactions may not be eligible for replay if their data checksums do not match stored checksum values. If the transaction is not valid, then the replay of the transaction cannot proceed (error block 1820). Assuming the transaction is valid, block 1830 next involves filtering out log actions that do not need replaying. In one embodiment, this may be because the locks needed to do these log actions have been released cleanly in the past and hence the metadata has possibly been reused by other clients. This may be determined with relative ease using the lock version. For example, if the current lock version 42A stored in the lock 36A on disk doesn't match the lock version stored in the corresponding lock action that the log action depends on through the Required Lock ID field 52, the log action has already been successfully committed to disk. This is due to the fact that disk locks are released after committing log actions to disk, and lock versions are changed when disk locks are successfully released. In other words, if the lock version does not match, the log action has already made it to disk. It is appreciated that it may be possible for some log actions of a transaction to have been committed while others might not be committed if the server crashed while committing the transaction. The lock 36A is successfully located and read from the file system 64 for lock version comparison using the lock address stored in the lock action 48.

At block 1840, metadata operations associated with the remaining log actions are performed. This may be achieved by reading metadata length 54 number of bytes from metadata field 56 and writing it out to location disk address 53 of metadata 56 in the file system 64. In one embodiment, once the log actions are either filtered or replayed, the transaction may be purged (block 1850). In one embodiment, this may involve writing some data to the transaction to invalidate it. For example, a sector worth of zeros may be written into the transaction header. Finally, the version fields 42 of locks 36 belonging to replayed log actions are changed/incremented (block 1855), and the locks 36 are subsequently released (block 1860). It should be apparent that all disk locks held by a crashed server 12 can be broken and reused by other machines after replaying the crashed server's journal. This is because all locks that server 12 was holding to do metadata updates will be released after replaying the journal in step 1960. All other disk locks that were held by server 12, but did not appear in its journal 32 were clearly not held to update metadata and hence do not require additional processing before breaking and reusing them.

Thus, embodiments allow for the implementation of a truly distributed transaction manager. The implementation includes a suitable transaction and journal format, such that every host may maintain its own journal without communicating with other hosts sharing the same file system or database. Hosts execute transactions independent of each other, and embodiments can guarantee that the set of resources that are part of a given host transaction are not being updated by any other hosts at that particular point in time. As such, embodiments allow for hosts to replay or undo transactions in a given journal post-crash, independent of any other journal that may exist on the same file system or database, the result being a partially and sufficiently consistent file system. Additionally, embodiments allow for an upper bound to be placed on the amount of space required per journal, per host. This makes embodiments scalable to a large number of hosts concurrently accessing the file system or database because the storage requirements do not grow exponentially, which also imposes an upper bound on crash recovery time per journal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A distributed transaction system comprising:
a first computing entity;
a second computing entity; and
a data storage unit, coupled with said first computing entity and said second computing entity, said data storage unit storing a file system, a first transaction journal for said first computing entity, and within the file system a second transaction journal for said second computing entity, a plurality of data entities including file descriptors, files, and a block bitmap, and a lock for each of the data entities comprising an owner field and a version field, wherein
the first transaction journal is updated with entries that describe transactions executed by the first computing entity on the data entities during periods in which the first computing entity gained exclusive access to the data entities by having acquired the locks associated with the data entities, and the second transaction journal is updated with entries that describe transactions executed by the second computing entity on the data entities during periods in which the second computing entity gained exclusive access to the data entities by having acquired the locks associated with the data entities, and
at least one of the entries include a log action that indicates updates made to a data entity during the transaction described by the entry, and a lock action that indicates an address of a lock that was exclusively acquired during the transaction described by the entry and a version number written into the version field of the lock during the transaction described by the entry.

2. The distributed transaction system as recited in claim 1 wherein said version field comprises a first value, and wherein further said first computing entity is operable to change said version field from said first value to a second value upon acquisition of said lock.

3. The distributed transaction system as recited in claim 2 wherein said first computing entity is operable to change said version field from said second value to a third value upon releasing said lock.

4. The distributed transaction system as recited in claim 1 wherein said first computing entity is operable to detect whether said second computing entity has crashed.

5. The distributed transaction system as recited in claim 4 wherein said first computing entity is operable to deallocate said second transaction journal and return freed space to said file system if said first computing entity detects that said second computing entity has crashed.

6. The distributed transaction system as recited in claim 4 wherein said first computing entity is operable to replay said second transaction journal if said first computing entity detects that said second computing entity has crashed.

7. The distributed transaction system as recited in claim 1 wherein said first computing entity is operable to deallocate said first transaction journal and return freed space to said file system prior to said first computing entity going offline.

8. A method for maintaining separate transaction journals in a file system that is accessible by first and second computing entities from a data storage unit that stores within the file system a plurality of data entities including file descriptors, files, and a block bitmap, and a lock for each of the data entities comprising an owner field and a version field, the first transaction journal being maintained by the first computing entity and the second transaction journal being maintained by the second computing entity, said method comprising:

acquiring a lock corresponding to a data entity on said file system by one of the first and second computing entities by writing an owner ID thereof into the owner field of the lock;

if the lock corresponding to the data entity is acquired by the first computing entity:

changing a value in the version field of the lock by the first computing entity;

updating said data entity by the first computing entity;

creating a first transaction entry by the first computing entity, wherein said first transaction entry describes an update to said data entity and includes a lock action that indicates an address of the lock and the value in the version field of the lock; and committing said first transaction entry to said first transaction journal by the first computing entity; and if the lock corresponding to the data entity is acquired by the second computing entity:

changing a value in the version field of the lock by the second computing entity;

updating said data entity by the second computing entity;

creating a second transaction entry by the second computing entity, wherein said second transaction entry describes an update to said data entity and includes a lock action that indicates an address of the lock and the value in the version field of the lock; and committing said second transaction entry to said second transaction journal by the second computing entity.

9. The method as recited in claim 8 further comprising:
writing said update of said data to said data entity; and
changing said version field from said second or third value to a fourth value.

10. The method as recited in claim 8, wherein changing said version field comprises monotonically incrementing said version field.

11. The method as recited in claim 8 wherein creating said transaction comprises:
registering said lock with said transaction entry; and
registering undo actions with said transaction entry.

12. The method as recited in claim 11 wherein creating said transaction further comprises:
calculating a checksum corresponding to said transaction; and
writing said checksum to said transaction entry.

13. The method as recited in claim 8 further comprising:
initiating said method upon detecting a request to a structured data system that will result in modification of said data of said data entity.

14. The method as recited in claim 8 further comprising:
reserving an unused transaction entry slot in said first or second transaction journal to be used for said transaction entry.

15. The method as recited in claim 14 wherein reserving said unused transaction entry slot comprises maintaining an in-memory bitmap of used transaction entry slots in said first or second transaction journal.

16. The method as recited in claim 14 wherein said first or second transaction journal has a fixed length, and wherein further reserving said unused transaction entry slot comprises waiting for said transaction entry slot to free.

17. The method as recited in claim 9 further comprising:
performing a zombie transaction writeback, if the writing of the update is unsuccessful.

* * * * *